United States Patent
Averbuch et al.

(10) Patent No.: US 9,506,763 B2
(45) Date of Patent: Nov. 29, 2016

(54) METHOD AND APPARATUS FOR PROVIDING AGGREGATED NOTIFICATIONS FOR TRAVEL SEGMENTS

(71) Applicant: HERE Global B.V., Veldhoven (NL)

(72) Inventors: Alex Averbuch, Buffalo Grove, IL (US); Gavril Giurgiu, Chicago, IL (US); Leon Stenneth, Chicago, IL (US)

(73) Assignee: HERE Global B.V., Veldhoven (NL)

( * ) Notice: Subject to any disclaimer, the term of this patent is extended or adjusted under 35 U.S.C. 154(b) by 0 days.

(21) Appl. No.: 14/609,950

(22) Filed: Jan. 30, 2015

(65) Prior Publication Data

US 2016/0223343 A1 Aug. 4, 2016

(51) Int. Cl.
*G01C 21/26* (2006.01)
*B60W 50/14* (2012.01)

(52) U.S. Cl.
CPC .............. *G01C 21/26* (2013.01); *B60W 50/14* (2013.01); *B60W 2050/143* (2013.01); *B60W 2050/146* (2013.01)

(58) Field of Classification Search
CPC .. G01C 21/26; G01C 21/36; G01C 21/3697; G06F 17/00; B60W 50/14; B60W 2050/143; B60W 2050/146
See application file for complete search history.

(56) References Cited

U.S. PATENT DOCUMENTS

| | | | |
|---|---|---|---|
| 6,308,133 B1 | 10/2001 | Loffert et al. | |
| 8,065,365 B2 | 11/2011 | Saxena et al. | |
| 2003/0009277 A1* | 1/2003 | Fan | G01C 21/3492 701/117 |
| 2005/0259606 A1 | 11/2005 | Shutter et al. | |
| 2006/0041372 A1* | 2/2006 | Kubota | G01C 21/3697 701/532 |
| 2007/0050127 A1* | 3/2007 | Kellum | G01C 21/3697 701/439 |
| 2007/0089054 A1 | 4/2007 | Morimoto | |
| 2009/0299624 A1 | 12/2009 | Denaro | |
| 2012/0295645 A1 | 11/2012 | Yariv et al. | |
| 2013/0274996 A1* | 10/2013 | Sekine | B60W 50/14 701/36 |
| 2015/0253778 A1* | 9/2015 | Rothoff | G05D 1/0088 701/25 |
| 2016/0063045 A1* | 3/2016 | Stanek | G06F 17/30616 707/741 |

FOREIGN PATENT DOCUMENTS

EP 2466260 A1 6/2012

OTHER PUBLICATIONS

Bradley Buda, "Don't Spam Your Users: Batch Notifications in Rails", blog created Apr. 23, 2013 on Meldium.com, 8 pages.
Office Action for corresponding European Patent Application No. 16152995.3-1803, dated Jun. 1, 2016, 6 pages.

* cited by examiner

*Primary Examiner* — Aaron L Troost
(74) *Attorney, Agent, or Firm* — Ditthavong & Steiner, P.C.

(57) ABSTRACT

An approach is provided for determining a plurality of notifications associated with one or more curved sections of at least one travel segment. The approach involves causing, at least in part, an aggregation of the plurality of notifications into at least one aggregated notification based, at least in part, on a road distance threshold between the one or more curved sections. The approach also involves causing, at least in part, a presentation of the at least one aggregated notification in place of separately presenting the plurality of notifications.

20 Claims, 16 Drawing Sheets

900

1000

1100

METHOD AND APPARATUS FOR PROVIDING AGGREGATED NOTIFICATIONS FOR TRAVEL SEGMENTS

BACKGROUND

There is a growing interest in the development of vehicles that are highly automated and increasingly interactive with the vehicle users (e.g., autonomous vehicles, highly-assisted vehicles (HAD), advanced driver assistance systems (ADAS), etc.). As part of this increased automation or driver-assistance, these vehicles, for example, may alert their users regarding important driving conditions encountered while traveling along a travel segment (e.g., road) via various notification mechanisms. However, these alerts or notifications can become potentially distracting or overwhelming to the user, particularly, when the notifications are repetitive or relate to closely spaced but similar conditions (e.g., encountering multiple consecutive dangerous curves along a travel segment). As a result, service providers and device manufacturers face significant technical challenges in providing relevant alerts to vehicle users while minimizing driver distractions.

SOME EXAMPLE EMBODIMENTS

Therefore, there is a need for an approach that aggregates notifications for presentation to a user during travel.

According to one embodiment, a method comprises determining a plurality of notifications associated with one or more curved sections of at least one travel segment. The method also comprises causing, at least in part, an aggregation of the plurality of notifications into at least one aggregated notification based, at least in part, on a road distance threshold between the one or more curved sections. The method further comprises causing, at least in part, a presentation of the at least one aggregated notification in place of separately presenting the plurality of notifications.

According to another embodiment, an apparatus comprises at least one processor, and at least one memory including computer program code, the at least one memory and the computer program code configured to, with the at least one processor, cause, at least in part, the apparatus to determine a plurality of notifications associated with one or more curved sections of at least one travel segment. The apparatus is also caused to cause, at least in part, an aggregation of the plurality of notifications into at least one aggregated notification based, at least in part, on a road distance threshold between the one or more curved sections. The apparatus is further caused to cause, at least in part, a presentation of the at least one aggregated notification in place of separately presenting the plurality of notifications.

According to another embodiment, a computer-readable storage medium carries one or more sequences of one or more instructions which, when executed by one or more processors, determine a plurality of notifications associated with one or more curved sections of at least one travel segment. The apparatus is also caused to cause, at least in part, an aggregation of the plurality of notifications into at least one aggregated notification based, at least in part, on a road distance threshold between the one or more curved sections. The apparatus is further caused to cause, at least in part, a presentation of the at least one aggregated notification in place of separately presenting the plurality of notifications.

According to another embodiment, an apparatus comprises means for determining a plurality of notifications associated with one or more curved sections of at least one travel segment. The apparatus also comprises means for causing, at least in part, an aggregation of the plurality of notifications into at least one aggregated notification based, at least in part, on a road distance threshold between the one or more curved sections. The apparatus further comprises means for causing, at least in part, a presentation of the at least one aggregated notification in place of separately presenting the plurality of notifications.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing aggregated notifications for travel segments are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to highly-assisted driving (HAD) vehicles and advanced driver assistance systems (ADAS), it is contemplated that the approaches of the various embodiments described herein are applicable to any type of vehicles as well as to vehicles for which an operational configuration can be determined or recommended.

Moreover, although various embodiments are described with respect to aggregating notifications associated with curved sections (e.g., dangerous curves) of a travel segment, it is contemplated that the notifications may relate to any feature or characteristic of the travel segment. For example, instead of or in addition to curved sections, the notifications that can be aggregated using the various embodiments of the approaches described herein may relate other conditions including, but not limited to, road conditions, traffic conditions, environmental conditions, points of interests, and/or any other location-based notifications. Accordingly, it is contemplated that any discussion of notifications and/or curve-related features (e.g., dangerous curves) is applicable to any location-based notification.

Figure 1A:
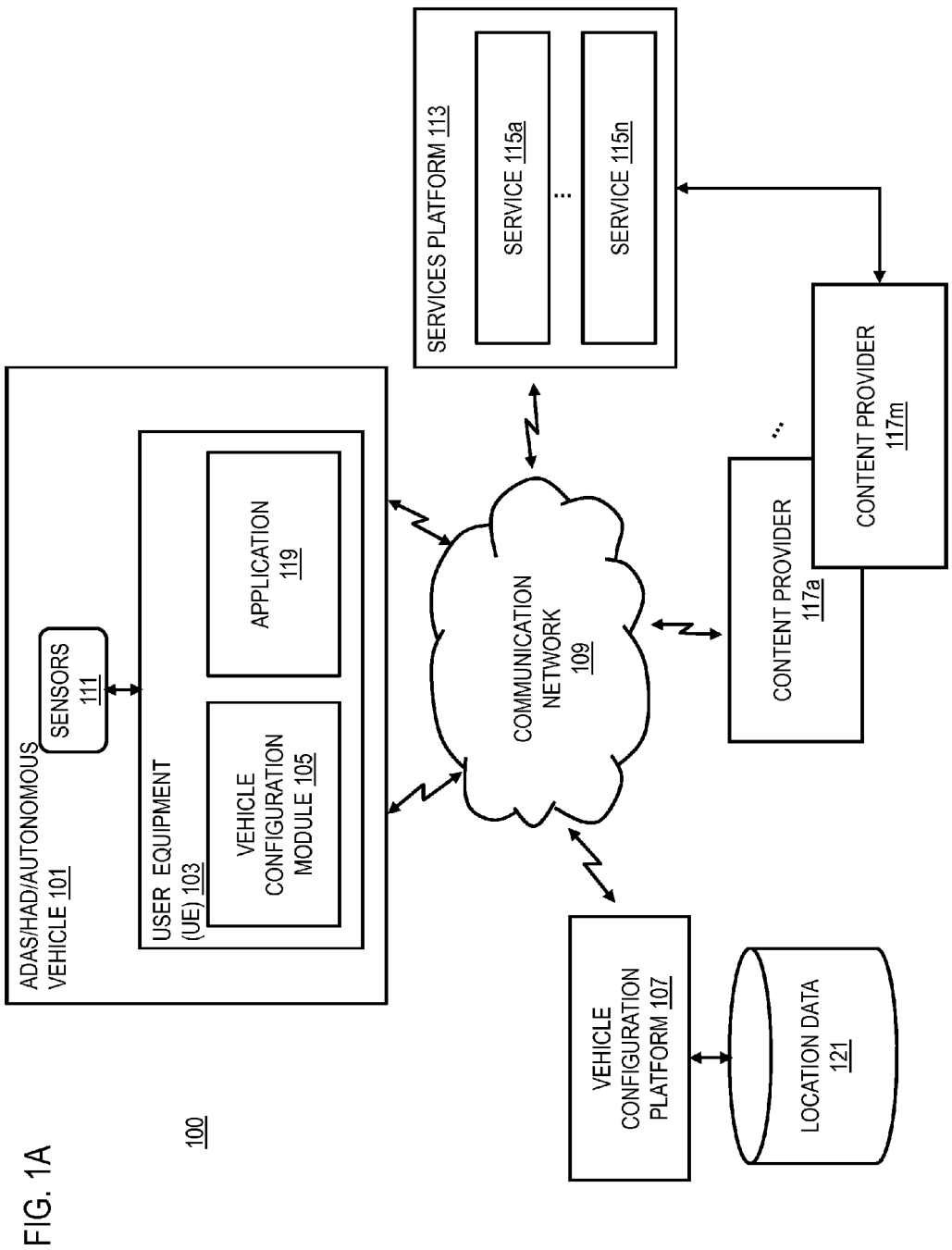
FIG. 1A is a diagram of a system capable of providing aggregated notifications for travel segments, according to one embodiment.

FIG. 1A is a diagram of a system 100 capable of providing aggregated notifications for travel segments, according to one embodiment. As noted above, ADAS/HAD vehicles are able to partially drive themselves with the inputs and/or commands of vehicle passengers or occupants. In some embodiments, the vehicles achieve this driving state in combination with, for instance, map data (e.g., three-dimensional map data), sensors, and information received from network-based services and/or other vehicles. However, with less than fully autonomous vehicles or when the driver has control of a vehicle (e.g., non-autonomous vehicles or autonomous vehicles operating in manual mode), interaction between vehicle and user may be needed at various times, such as in uncertain terrain or other uncertain conditions. In some embodiments, the interaction is conducted, in part, through notifications (e.g., related upcoming road or travel segments) to the user. In turn, to avoid potential driver distraction, these notifications can be presented by the system 100 in a manner that is likely to be least distracting to the user while still conveying the desired information. As discussed, an aggregation of notifications for several consecutive dangerous curves and/or other travel segment features is thus used to inform the user while not creating a distraction. Thus, for several dangerous curves or other features that occur within a short distance of one another, the system 100 can notify the user once before encountering the multiple curves and thereby allow the driver/user to both plan ahead and concentrate on the task of navigating the difficult terrain. As a result, ADAS/HAD vehicles or vehicles capable of presenting notifications are able to safely operate by using a measured number of notifications.

For example, ADAS/HAD vehicle system 100 may include a threshold criterion based on the distance, travel time, safe speed, or other parameter between curved sections or other features of a travel segment. In one embodiment, if a user is traveling along a route with a large number of contiguous high curvature sections, the system 100 can aggregate a number of these potential notifications. If a ADAS/HAD vehicle is traveling on a winding road with three dangerous curves within several hundred meters of one another, the system 100 may aggregate two or more of the notifications if the said dangerous curves or other travel segment features are spaced at a distance within a predetermined threshold distance, threshold travel time, threshold speed, threshold acceleration, a combination thereof, or other like threshold criterion.

For example, ADAS/HAD vehicles may maintain high speeds under varying conditions and plan an appropriate route with minimal driver input. However, this speed and route (or other operational configuration parameter) of the ADAS/HAD vehicle may be compromised in some instances. As discussed above, at least some discomfort or inefficiency with the automated features may occur in difficult terrain or in sundry conditions, thus requiring the vehicle user to intervene or manually operate the vehicle. Unaided, these difficulties can lead to the ADAS/HAD vehicle driving in an abrupt or idiosyncratic manner in conditions that are unstable or dangerous, such as for high curvature roads, poor road conditions, construction areas, near park cars, and other such situations where human decision making would supersede the highly automated vehicle features. Furthermore, such highly automated vehicle function in conjunction with user inputs and personalized features necessitates more user communication by way of a display, voice inputs, a combination thereof, or other like means. Such frequent communication, while effective for navigation, can become excessive if the user's overall driving behavior and penchant for distraction is not taken into account.

To address this problem, a system 100 of FIG. 1A introduces the capability to aggregate dangerous curve notifications using criteria based on the distance, travel time, travel speed, or other like parameters between high curvature travel segments. If a user is traveling along a route with a large number of contiguous high curvature sections, the system 100 can aggregate a number of these would be notifications. For example, in one embodiment, if a ADAS/HAD vehicle is traveling on a winding road with many dangerous curves and often within several hundred meters of one another, the system 100 may aggregate two or more notifications if the said curve segments are spaced within a predetermined distance, travel time, travel speed, or other criteria.

Although the various embodiments described herein are discussed with dangerous curve notifications in mind, it is also contemplated that the approaches described herein as related to curve notifications may also be generalized to other notifications for dangerous or problematic travel areas. Such travel areas may include dangerous slopes, construction areas, lane change areas, merge areas, object avoidance areas, other road hazards, and/or other like problem areas. The system 100 may determine these problem areas, notify the user, and/or cause, at least in part, an aggregation of the plurality of notifications into at least one aggregated notification based, at least in part, on a road distance threshold between the one or more curved sections; and cause, at least in part, a presentation of the at least one aggregated notification in place of separately presenting the plurality of notifications. This system may integrate the notifications with navigational features using mapping data, sensor data, crowd source data, network information, a combination thereof, or other like means. It is also contemplated that the approaches described herein as related to notifications may be integrated with other operational configuration parameters such as speed rate, acceleration rate, braking rate, steering rate, cornering forces, and the like, such that the vehicle takes into account an appropriate operational configuration consistent with dangerous curves, road hazards, or other like problem areas.

In an example use case, an ADAS/HAD vehicle is traveling about a mountainous road segment and encounters many dangerously sharp curves that require a user notification. In a particular stretch, the vehicle is passing three treacherous curves within several hundred meters. These curves, starting with dangerous curve one (DC1) are spaced at 400 meters (DC2) and 550 meters (DC3) from DC1, respectively. Thus, if the system has set a threshold criterion of 200 meters, and the first two dangerous curves travel segments (DC1, DC2) are 400 meters apart and a second pair of dangerous curves (DC2, DC3) are 150 meters apart, the system 100 may aggregate the second pair (DC2, DC3), so that there are two actual notifications for the three dangerous curve 550 meter segment. This is deemed to give sufficient warning to the user while preventing unnecessary distraction/noise as the DC2/DC3 segments are navigated. Thus, by providing a determination of problem travel areas, the system 100 can potentially reduce user discomfort and improve safety while riding in an autonomous or semi-autonomous vehicle.

As shown in FIG. 1A, the system 100 comprises an autonomous vehicle 101 configured with at least one user equipment (UE) 103 including a vehicle configuration module 105 that provides functions related to cause a presentation of an aggregated notification in place of separately presenting the notifications for a plurality of dangerous curves for the ADAS/HAD vehicle 101 using mapping data, sensor data, crowd source data, and/or network information in the various embodiments discussed herein. In one embodiment, the autonomous vehicle 101, the UE 103, and/or the vehicle configuration module 105 has connectivity to a vehicle configuration platform 107 over a communication network 109. By way of example, the vehicle configuration platform 107 may be a network component that can perform all or a portion of the functions of the vehicle configuration module 105 which is a component local to the UE 103.

By way of example, the UE 103 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, devices associated with one or more vehicles or any combination thereof, including the accessories and peripherals of these devices, or any combination thereof. It is also contemplated that the UE 103 can support any type of interface to the user (such as "wearable" circuitry, etc.). In one embodiment, the one or more vehicles may have cellular or Wi-Fi connection either through the inbuilt communication equipment or from the UE 103 associated with the vehicles. The application 119 may assist in conveying sensor information via the communication network 109.

Although the UE 103 is depicted as a separate component from the ADAS/HAD vehicle 101, it is contemplated that the functions of the UE 103 and/or the vehicle configuration module 105 may be performed or embedded in the ADAS/HAD vehicle 101 or a component of the ADAS/HAD vehicle 101. As shown, the ADAS/HAD vehicle 101 is further configured with the sensors 111 to assist with high-assisted driving. For example, the sensors 111 may include motion sensors, visual sensors including infrared sensors, lasers, radar, sonar, cameras (e.g., visible, night vision, etc.), and/or other devices/sensors that can scan and record data for the autonomous vehicle 101's surroundings to provide information to adequately aggregate dangerous curve notifications for the ADAS/HAD vehicle 101.

In one embodiment, the sensor information can be supplemented with additional information from network-based services such as those provided by the services platform 113 and the services 115a-115n (also collectively referred to as services 115). By way of example, the services 115 can include mapping service, navigation services, and/or other data services that provide data for determining dangerous curve travel segments and other like problem travel segments. In one embodiment, the services platform 113 and/or the services 115 can provide contextual information such weather, traffic, etc. as well as facilitate communications (e.g., via social networking services, messaging services, crowdsourcing services, etc.) among vehicles to share configuration information. In one embodiment, the services platform 113 and/or the services 115 interact with content providers 117a-117m that provide content data (e.g., map data, crowd source data, imaging data, etc.) to the services platform 113 and/or the services 115. In one embodiment, the UE 103 executes an application 119 that acts as client to the services platform 113, the services 115, the vehicle configuration module 105, and/or the vehicle configuration platform 107. In one embodiment, the curvature data, probe speed data, travel speed data, historic driving data, crowd source data, threshold data, sensor data, contextual information, and/or configuration information can be stored in the location database 121 for use by the vehicle configuration module 105 and/or the vehicle configuration platform 107.

As described above, in one embodiment, the system 100 may determine travel segment parameters including a road distance threshold or travel time threshold between two or more curved sections causing, at least in part, an aggregation of the plurality of notifications, the presentation of the at least one aggregated notification, or a combination thereof is based, at least in part, on the road distance or travel time threshold. For example, the notifications may be mapped for the road travel segments and incorporated into the on-board system, as well as gathered from a network, other vehicle, or other like sources. Furthermore, the system 100 may also include travel segment parameters for and between the one or more travel segments, which likewise may be incorporated into an on-board system, gathered from a network, or other like sources. These aforementioned data sources could also include mapping data, sensor data, user preference data, or other relevant datasets. As explained previously, the actual notifications are calculated by assessing and comparing the potential notification (dangerous curve) information and travel segment thresholds. One calculated the information can then be used to notify the user about dangerous curve travel segments using display, audio, seat vibrations, a combination thereof, or other like means.

Figure 11:
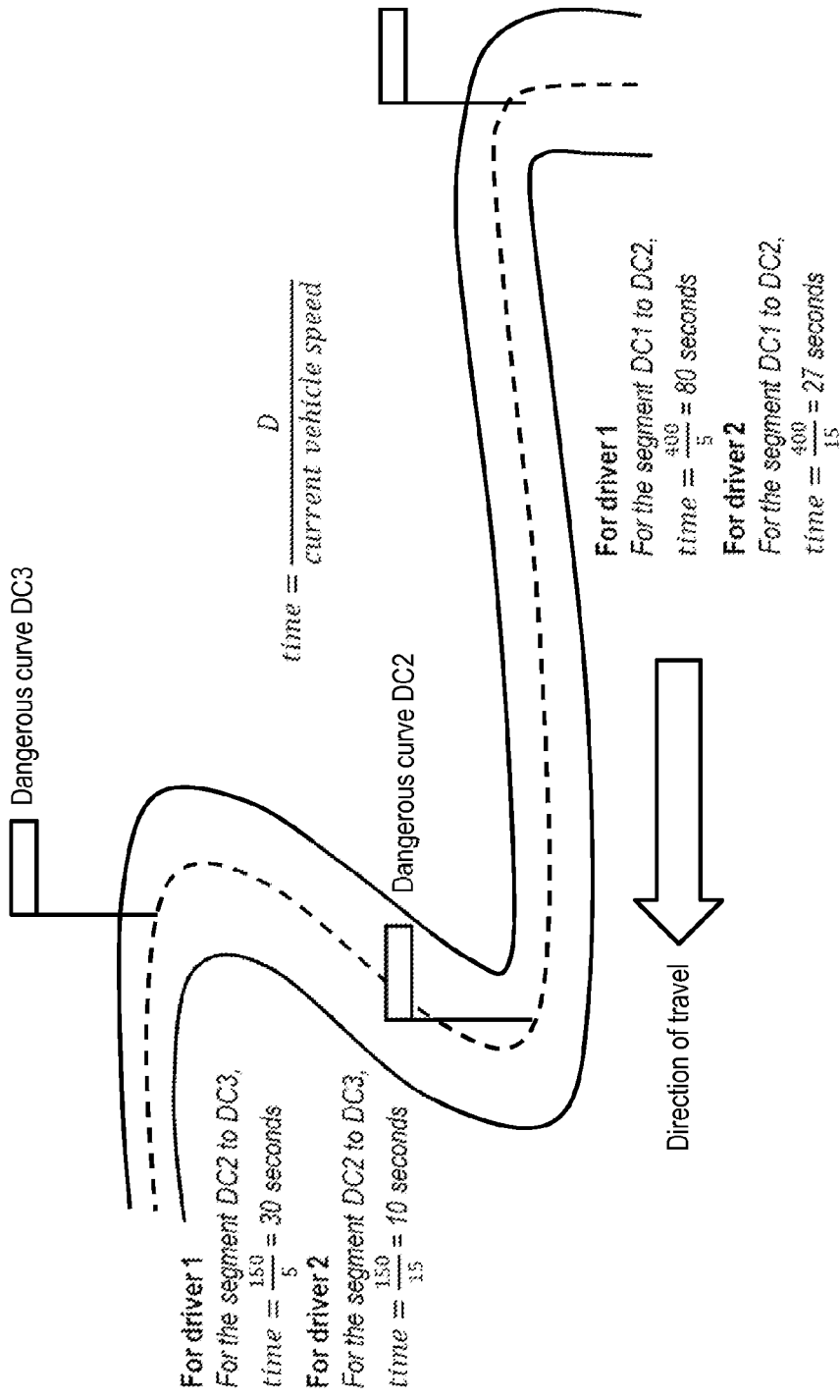
FIG. 11 is an illustration of a road travel segment with a plurality of notifications for one or more consecutive dangerous curves and an aggregation of the notifications based on a current vehicle speed, according to one embodiment.

For example, a user may be traveling in the autonomous vehicle 101 to a location with numerous curved roads. Notification configurations are placed at each of the high curvature segments that are mostly spaced within few hundred meters of one another. However, for the user, the system 100 need only communicate the danger a few times and each potential notification if all actualized would be redundant and distracting. Thus, the system 100 may aggregate these notification configurations so that the actual notifications occur only at opportune moments to ensure the user is aware that several dangerous curve segments are immediately ahead. In one embodiment, the user may be notified using an on-board interactive display as shown in FIG. 11, which can further incorporate user data into the system 100 using selection algorithms. Therefore, the system 100, once calibrated, can automatically aggregate the notification configurations into several actual notifications for the at least one vehicle. In another embodiment, the system 100 may prompt the user to choose a particular set of source data to identify problem areas and relevant routes with appropriate automated activity. The system 100 can then navigate and notify more efficiently by including such user inputs in addition to the automated notification calculations for the at least one vehicle.

In one embodiment, the system 100 may determine a road distance threshold, travel time threshold, an average probe speed, a personalized travel time, profile information, a safe speed threshold, or a combination thereof. In one scenario, the system 100 may perceive that a winding mountain road generates a high number of notification configurations for each sharp curve. These notification configurations may amount to perhaps 50 over only a few miles/kilometers and the system 100 can aggregate the notifications spaced within a threshold distance or threshold travel time from one another. Thus, the system 100 can register the high number of notifications and start aggregating them into far fewer actual notifications based on preprogramming or as prompted with a user interface. In another scenario, the system 100 may calculate an average probe speed using historic probes from different probe vehicles map matched to the travel segments. The system 100 may then determine which notification configurations can be aggregated when comparing this average probe speed with a threshold speed. Likewise, the system 100 may be configured to include personalized parameters for the user, based on an assortment of user characteristics, which can be used to estimate a current speed. In one embodiment, the current speed of a user can be compared with a safe speed threshold to determine if a notification is necessary altogether. As with several other embodiments, this data can be integrated and compared to other sources to indicate sources of error in such travels segment notification data sets and provide feedback for an updating of the system 100.

In one embodiment, the system 100 may cause, a presentation of the at least one aggregated notification in place of separately presenting the plurality of notifications by presenting the aggregated notifications before two or more curved travel sections with the actual notification corresponding to the first potential notifications of the series. The system 100 may designate a location before each travel segment for a presentation of a notification to a user. This location is targeted to give a user sufficient time and warning when approaching a dangerous or problematic travel segment, such as a dangerous curve. Thus, when causing a presentation of an aggregated notification in place of separately presenting the notifications for a plurality of dangerous curves, the system 100 necessarily designates the first notifications in the series for the single actual notification. In such manner, the user may have sufficient time and warning before the upcoming travel segments to plan accordingly. In one scenario, the notifications and aggregation thereof may be stored internally or displayed on the console to let the user decide whether to use manual control, or choose from viable route choices. Updates to the system 100 may be inputted manually, prompted by the user interface, or processed automatically as sensor or crowd source data. The update may also be held in the user data base as feedback information to incorporate into future driving experiences. In one scenario, the system 100 may prompt the user to specify a particular distance or travel time to use in designating a notification for a travel segment. This specified distance or travel time thus results in an updated system 100 configuration. In another scenario, sensor data related contextual information or crowd source information may be accessed to be processed as feedback information to update the system 100 travel segment notification designations.

In one embodiment, the system 100 may cause a separated notification for each of the potential notifications for each curved travel segment if the potential notifications are spaced at a distance greater than a threshold travel time. Thus, a given pair of potential notifications is considered spaced at a distance great enough for a corresponding pair of actual notifications, since the travel time spacing is designated as greater than the threshold travel time. In one scenario, the occupant may not be satisfied with the choice given and prefer another threshold travel time deemed more appropriate. Such updates may be processed manually, when prompted by the user interface, or in conjunction with crowd source data, network data, or sensor data. In one scenario, the update may also be held in a database as feedback information to incorporate into future driving experiences.

In one embodiment, the system 100 may determine the road distance threshold based, at least in part, on a fixed distance and cause the aggregation of the plurality of notifications, the presentation of the at least one aggregated notification, or a combination thereof is based, at least in part, on the travel time threshold for the one or more curves of the at least one travel segment. In one embodiment, the dangerous curve travel segments are assessed as potential problem areas in which the vehicle may have to provide a notification based on an on-board program, mapping data, or other like means. The curve may be assessed to determine whether the curvature is sharp enough, using the degree of curvature, to be deemed dangerous. In one scenario, a threshold for aggregation may be determined as a travel distance between two or more dangerous curve notification areas. Thus, two or more dangerous curve segments spaced closer than a threshold distance will be given only one notification for the given threshold distance. This actual notification may be given at the location of the first notification of the series of consecutive curves to warn the user.

In one embodiment, the system 100 may determine an average travel time based, at least in part, on average probe speed information for traveling one or more distances between the one or more curved sections; and cause, at least in part, the aggregation of the plurality of notifications, the presentation of the at least one aggregated notification, or a combination thereof is based, at least in part, on a comparison of the average travel time against the travel time threshold. In one embodiment, the average probe speed may be calculated from historic travel time data from different probes map-matched to the travel segments. This provides a "humanized" speed for the user. The data can be accessed using a variety of means including on-board computers, crowd source data, analysis from a network, sensor data, or other like means. In one embodiment, the system 100 can map the notifications and compare the travel times calculated from the average probe speeds to a threshold travel time and subsequently map the aggregated notifications for one or more consecutive dangerous curves. In one embodiment, the threshold for notification may be determined as a travel time between two or more dangerous curve notification areas. The given notifications may be spaced at a travel time (average probe speed) less than the threshold travel time and thus require an aggregated notification for multiple dangerous curves within the threshold travel time. This aggregated actual notification may be given at the location of the first notification of the series of consecutive curves to warn the user. In another scenario, the given notifications may be spaced at a travel time (average probe speed) greater than the threshold travel time and thus require an actual notification for each dangerous curve notification.

In one embodiment, the system 100 may determine a personalized travel time for the at least one vehicle based, at least in part, on travel speed information associated with the at least one vehicle for traveling one or more distances between the one or more curved sections, wherein the aggregation of the plurality of notifications, the presentation of the at least one aggregated notification, or a combination thereof is based, at least in part, on a comparison of the personalized travel time against the travel time threshold. In one embodiment, the system 100 may track the at least one vehicle's travel speed and use this speed to calculate a travel time for the one or more dangerous curve travel segments. In one embodiment, the system 100 may estimate a travel speed from personalized data, such as age, gender, demographic information such as health, income, or profession, or other such personalized information. In one scenario, the system 100 may determine whether this personalized travel time is less than a threshold travel time and then aggregate the notifications accordingly if the personalized travel time is less than the threshold travel time. In multiple embodiments, the threshold travel time may be selected based on a variety of factor including personal inputs, speed limit data, crowd source data, other vehicle data, and other like data. In multiple embodiments, the system 100 may determine whether this personalized (current speed) travel time is less than a threshold travel time and then aggregate the notifications accordingly if the travel time is less than the threshold travel time. In another scenario, the given notifications may be spaced at a personalized travel time greater than the threshold travel time and thus require an actual notification for each of the potential dangerous curve notifications.

In one embodiment, the system 100 may determine travel speed to include, at least in part, current travel speed information, historical travel speed information, predicted travel speed information, or a combination thereof. In one embodiment, the system 100 may track the at least one vehicle's current travel speed information, historical travel speed information, predicted travel speed information, or a combination thereof using a variety of means including historical data from one or more vehicles, crowd source data, sensor data, network data, and other like means. Thus determined, this speed can be used to calculate a travel time for the one or more dangerous curve travel segments. In one scenario, these travel times can be localized to the at least one vehicle for the at least one travel segment. In another scenario, the travel time may take into account user characteristics to modify the historical, current, or predicted travel time. In such manner, factors including age, health, gender, demographic information, personal preferences, and other like information can be used to modify, at least in part, the vehicle's travel time. In one scenario, the system 100 may determine whether the historical, current, or predicted travel time is less than a threshold travel time and then aggregate the notifications accordingly if the travel speed or consonant travel time is less than the threshold travel time. The threshold travel time may be selected using one or more factors including mapping data, speed limit data, personal inputs, crowd source data, other vehicle data, and other like data.

In one embodiment, the system 100 may determine profile information, contextual information, or a combination thereof associated with the at least one vehicle, at least one driver of the at least one vehicle, or a combination thereof; and determining the travel speed information based, at least in part, on the profile information, the contextual information, or a combination thereof, wherein the profile information includes, at least in part, age information, gender information, demographic information, or a combination thereof. In one embodiment, the system 100 may calculate travel speed information based in part on a personalized travel time and/or travel distance based on personalized profile information. Such profile information may include age, gender, demographic information, historic data, professional information, and other personalized data to estimate travel speed information, such as an average speed travel time. Thus determined, this travel speed can be used to calculate a travel time for the one or more dangerous curve travel segments. The profile derived average speed travel time and threshold travel times may be map-matched to relevant travel segments to aggregate the notifications of consecutive curves spaced within the distance/travel time threshold.

In one embodiment, the system 100 may determine travel speed information including, at least in part, a current travel speed of the at least one vehicle, the method further comprising: causing, at least in part, a comparison of the current travel speed to at least one safe speed specified for the at least one travel segment, the one or more curved segments, or a combination thereof to determine whether to cause, at least in part, an initiation of the aggregation of the plurality of notifications, the presentation of the at least one aggregated notification, or a combination thereof. In one embodiment, the system 100 may provide a safe speed threshold using a variety of means including one or more or mapping data, speed limit data, preprogrammed on-board automated algorithms, historical data, sensor data, network data, and other like means. Thus determined, this safe speed threshold can be compared with a current vehicle speed of the user and only if the vehicle speed (current speed) is higher than the safe speed will a notification be sent. Similarly, the system 100 may determine whether the current vehicle travel time is less than a safe speed travel time and then notify the user only if the current travel time is less than the threshold safe travel time. In one scenario, the safe speed travel time can be personalized to the individual user or localized to the at least one vehicle traveling the at least one travel segment. In such manner, personalized factors including age, health, gender, personal preferences, and other like information can be used to modify, at least in part, the vehicle's safe speed travel time.

By way of example, the communication network 109 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 103 is any type of embedded terminal, mobile terminal, fixed terminal, or portable terminal including a vehicle control unit, a head unit, a portable navigation device (PND), a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 103 can support any type of interface to the user (such as "wearable" circuitry, etc.).

By way of example, the ADAS/HAD vehicle 101, the UE 103, the vehicle configuration module 105, the vehicle configuration platform 107, the sensors 111, and the application 119 communicate with each other and with other components of the communication network 109 using well known, new or still developing protocols. In this context, a protocol includes a set of rules defining how the network nodes within the communication network 109 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

By way of example, the sensors 111 may be any type of sensor to detect information about the environment surrounding the ADAS/HAD vehicle 101. The sensor system 111 may include sensors configured to monitor internal systems of the ADAS/HAD vehicle 101 (e.g., 02 monitor, fuel gauge, engine oil temperature, wheel speed sensors, etc.). One or more of the sensors 111 may be configured to be actuated separately or collectively in order to modify a position and/or an orientation of the one or more sensors 111. In some embodiments, the sensor system 111 may include an inertial measurement unit, a laser rangefinder/

LIDAR unit, a radar unit, infrared, an image gathering device such as a camera, or a microphone. In certain embodiments, the sensors 111 may include, for example, a global positioning sensor for gathering location data (e.g., GPS), a health sensor (e.g. heart-rate monitor, blood pressure monitor, etc.), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, and the like.

In one embodiment, the sensors 111 may include, orientation sensors augmented with height sensor and acceleration sensor, tilt sensors to detect the degree of incline or decline of the vehicle along a path of travel, light sensors, moisture sensors, pressure sensors, audio sensors (e.g., microphone), etc. In another example embodiment, the sensors 111 may detect weather data, passenger status (e.g., the number of passengers actively seated), etc. Further, sensors about the perimeter of the vehicle may detect the relative distance of the vehicle from sidewalks, lane or roadways, the presence of other vehicles, trees, benches, water, potholes and any other objects, or a combination thereof. Still further, the one or more sensors may provide in-vehicle navigation services, wherein one or more location based services may be provided to the at least one UE 103 associated with the at least one user of the vehicle and/or at least one other UE 103 associated with the ADAS/HAD vehicle 101.

In one embodiment, the vehicle configuration platform 107 may be a platform with multiple interconnected components. The vehicle configuration platform 107 may include multiple servers, intelligent networking devices, computing devices, components and corresponding software for aggregating a plurality of notification configurations to give an actual notification.

Figure 1B:
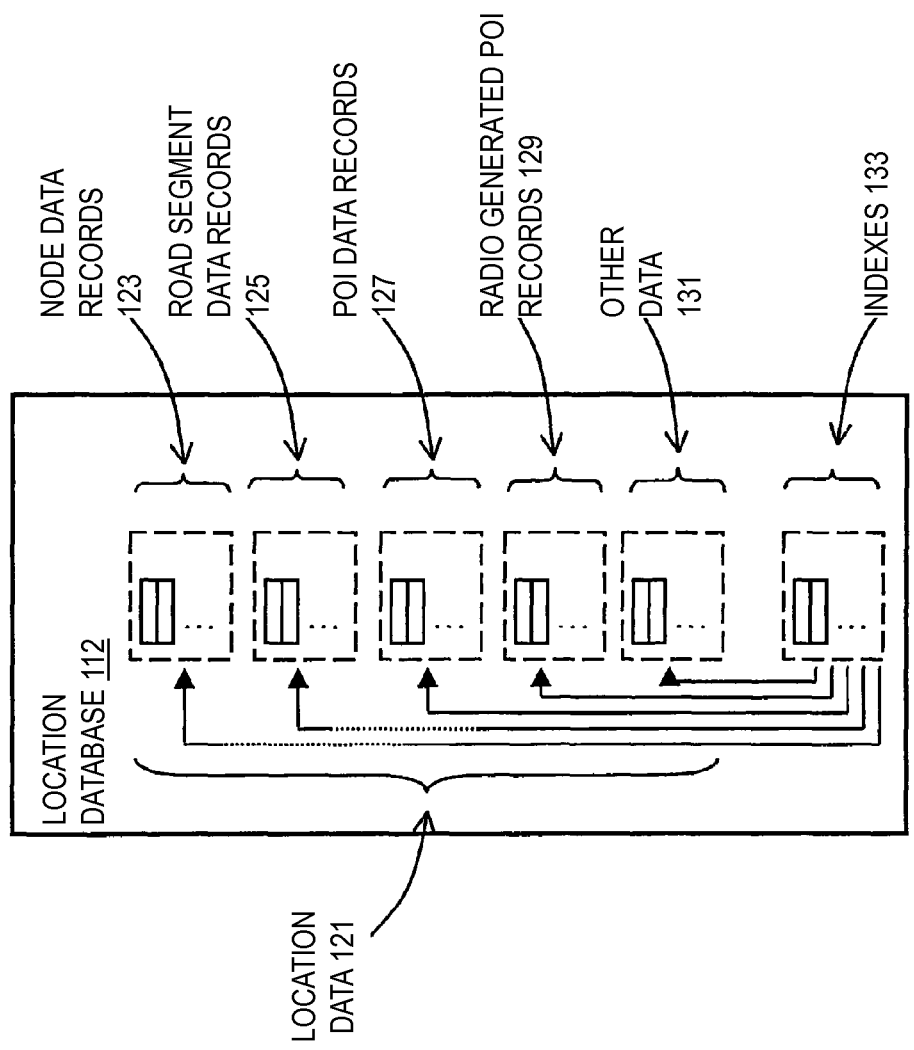
FIG. 1B is a diagram of the location database 112 of system 100, according to exemplary embodiments

FIG. 1B is a diagram of the location database 112 of system 100, according to exemplary embodiments. In the exemplary embodiments, POIs and map generated POIs data can be stored, associated with, and/or linked to the location database 112 or data thereof. In one embodiment, the location or map database 112 includes location data 121 used for (or configured to be compiled to be used for) mapping and/or navigation-related services, such as for personalized route determination, according to exemplary embodiments. For example, the location database 112 includes node data records 123, road segment or link data records 125, POI data records 127, radio generated POI records 129, and other data records 131, for example. More, fewer or different data records can be provided. In one embodiment, the other data records 131 include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or location records via position or GPS data associations (such as using known or future map matching or geo-coding techniques), for example.

In exemplary embodiments, the road segment data records 125 are links or segments representing roads, streets, parking areas, or paths, as can be used in the calculated route or recorded route information for determination of one or more personalized routes, according to exemplary embodiments. The node data records 123 are end points corresponding to the respective links or segments of the road segment data records 125. The road link data records 125 and the node data records 123 represent a road network, such as used by vehicles, cars, and/or other entities. Alternatively, the location database 112 can contain path segment and node data records or other data that represent pedestrian paths or areas in addition to or instead of the vehicle road record data, for example.

The road link and nodes can be associated with attributes, such as location coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, parking areas (attributes on which parking areas are critical) etc. The location database 112 can include data about the POIs and their respective locations in the POI data records 127. The location database 112 can also include data about places, such as cities, towns, or other communities, and other location features, such as bodies of water, mountain ranges, etc. Such place or feature data can be part of the POI data 127 or can be associated with POIs or POI data records 127 (such as a data point used for displaying or representing a position of a city). In addition, the location database 112 can include data from radio advertisements associated with the POI data records 127 and their respective locations in the radio generated POI records 129. By way of example, a street is determined from the user interaction with the UE 103 and the content information associated with the UE 103, according to the various embodiments described herein.

The location database 112 can be maintained by the content provider in association with the services platform 113 (e.g., a map developer). The map developer can collect location data to generate and enhance the location database 112. There can be different ways used by the map developer to collect data. These ways can include obtaining data from other sources, such as municipalities or respective location authorities (e.g., designated parking areas). In addition, the map developer can employ field personnel to travel by vehicle along roads throughout the location region to observe features and/or record information about them, for example. Also, remote sensing, such as aerial or satellite photography, can be used.

The location database 112 can be a master location database stored in a format that facilitates updating, maintenance, and development. For example, the master location database 112 or data in the master location database 112 can be in an Oracle spatial format or other spatial format, such as for development or production purposes. The Oracle spatial format or development/production database can be compiled into a delivery format, such as a location data files (GDF) format. The data in the production and/or delivery formats can be compiled or further compiled to form location database products or databases, which can be used in end user navigation devices or systems.

For example, location data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 103, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received location database in a delivery format to produce one or more compiled navigation databases.

As mentioned above, the location database 112 can be a master location database, but in alternate embodiments, the location database 112 can represent a compiled navigation database that can be used in or with end user devices (e.g., UEs 103) to provided navigation-related functions. For example, the location database 112 can be used with the UE 103 to provide an end user with navigation features. In such a case, the location database 112 can be downloaded or stored on the UE 103, such as in the applications 103, or the UE 103 can access the location database 112 through a wireless or wired connection (such as via a server and/or the communication network 109), for example.

Figure 2:
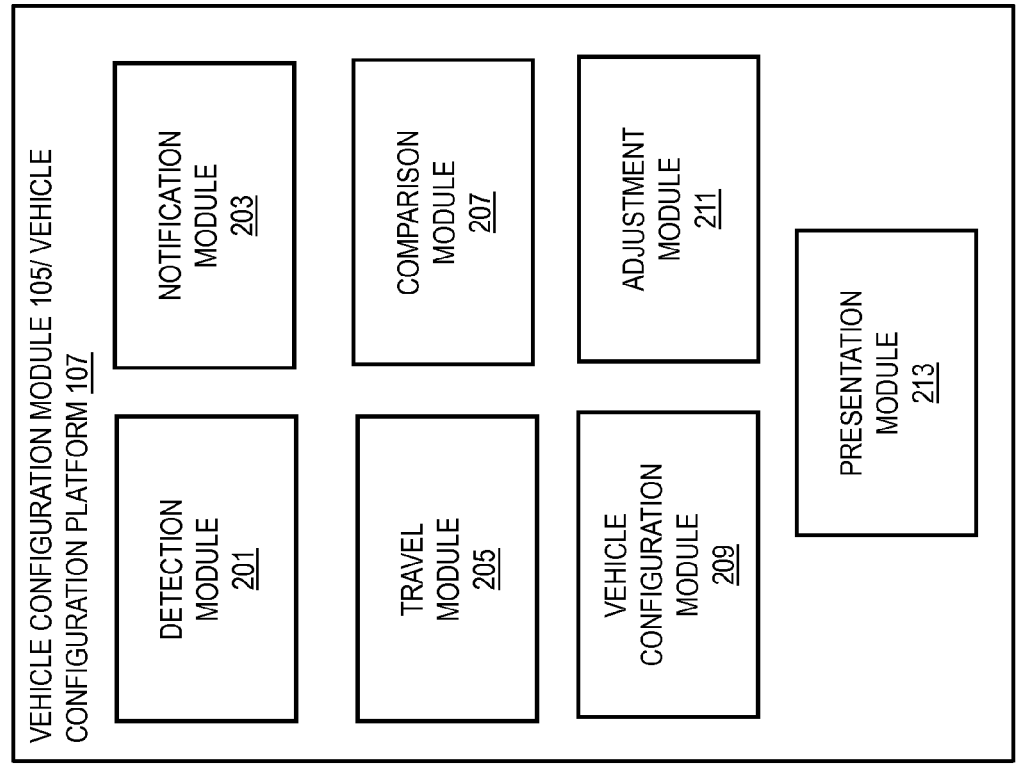
FIG. 2 is a diagram of the components of a vehicle configuration module 105/vehicle configuration platform 107, according to one embodiment.

FIG. 2 is a diagram of the components of a vehicle configuration module 105/vehicle configuration platform 107, according to one embodiment. By way of example, the vehicle configuration module 105/vehicle configuration platform 107 includes one or more components causing a presentation of an aggregated notification in place of separately presenting the notifications for a plurality of dangerous curves. It is contemplated that the functions of these components may be combined in one or more components or performed by other components of equivalent functionality. In one embodiment, the vehicle configuration module 105/vehicle configuration platform 107 includes a detection module 201, a notification module 203, a travel module 205, a comparison module 207, a vehicle configuration module 209, an adjustment module 211, and a presentation module 213.

In one embodiment, the detection module 201 includes a system 100 integrated with on-board system algorithms, vehicle sensors 111, and network databases 121 for correlating or comparing differences between notification data, travel segment parameters, and threshold parameters. The mapping data can be preprogrammed into the vehicle system 100, gathered from crowd source data, or gathered from at least one vehicle sensors or devices, and processed via the notification module 203 and travel module 205 to provide a mapping of notifications and an aggregation into one or more actual notifications for one or more travel segments. In addition, the system may be integrated with one or more advanced detection methods that employ sensors, such as motion sensors, location sensors, lasers, radar, sonar, infrared and other like techniques, to maximize the ADAS/HAD system's assessment of the contextual environment. This detection module 201 may be further modified with user preferences and tolerances, which, in part, provide a personalized driving configuration.

In one embodiment, the notification module 203 includes an integrated system for evaluating curve segment notifications, such as dangerous curve notifications, for one or more travel segments. Such curve segment notifications can be stored in an on-board systems related database, modified manually, accessed when prompted by an application 119, or gathered from vehicle devices or sensors incorporated into the detection module 201 and processed via the notification module 203 to provide notification information. The notification module 203 may also be used to correlate the presentation of notifications with a commensurate speed, acceleration, braking and other like characteristics. These notifications may be further modified with user preferences and tolerances, which, in part, provide a personalized modification of the notification system.

In multiple embodiments, the travel module 205 provides one or more travel segment parameters for one or more travel segments. These travel segment parameters may include one or more of a road distance threshold, travel time threshold, an average probe speed, a time threshold, historic speed, current speed, predicted speed, a safe speed threshold, a combination thereof and other like parameters as relates to the relationship of two or more travel segments. The travel module can be integrated to include data from multiple sources including: 3-D mapping data, crowd source data, data from networks or databases, weather reports, and real-time information from other vehicles or data from one or more on-board vehicle sensors/detectors via the detection module 201 that is integrated with the processes of the travel module 205. This integration can provide a calculation for the travel characteristics including those as related to notifications via the notification module 203, which is determined to be most appropriate by way of these system processes, network information sources, and/or advanced sensors.

In multiple embodiments, the comparison module 207 will process the outputted information of the notification module 203 and travel module 205, respectively. The notification module 203 and travel module 205 calculate travel and notification information using a variety of means in order to optimize the number of notifications, comfort, efficiency, and/or safety. Therefore, the vehicle configuration platform 107 includes a comparison module 207 to evaluate the notification module 203 and travel module 205 modules and integrate the two using inputted data, algorithms, and process formats to calculate relevant information and determine discrepancies and errors for one or more travel segments. This notification data can be outputted to the vehicle configuration module 209 to provide the appropriate notifications and may include an assessment of potential problem areas including dangerous curve information that may necessitate a user choice of driving alternatives or activation of manual control.

In multiple embodiments, the vehicle configuration module 209 causes a presentation of an aggregated notification in place of separately presenting the notifications for a plurality of dangerous curves based, in part, on the comparison module 207, which evaluates the notification module 203 and travel module 205, respectively. This module 209 may make a determination of potential problem areas including dangerous curves, provide notifications, and make one more assessments. Numerous inputs may be applicable including network data, sensor inputs, personal preferences, real-time data and other like inputs. Furthermore, the vehicle configuration module 209 can incorporate feedback information via the adjustment module 211.

In multiple embodiments, the adjustment module 211 evaluates feedback information to provide adjustments for the vehicle configuration module 209 that result in an adjustment or updating of the one or more notifications based on the curve thresholds and travel parameters. This feedback might include user inputs through an application 119 using an interface such as to specify a travel distance or travel time for the aforementioned notifications. Or, the adjustment module 211 may provide feedback to the vehicle configuration module 209 by including data related to updated or real-time road map information, or occupant input data. Such information may be presented and interfaced to the at least one occupant via the presentation module 213.

Figure 3:
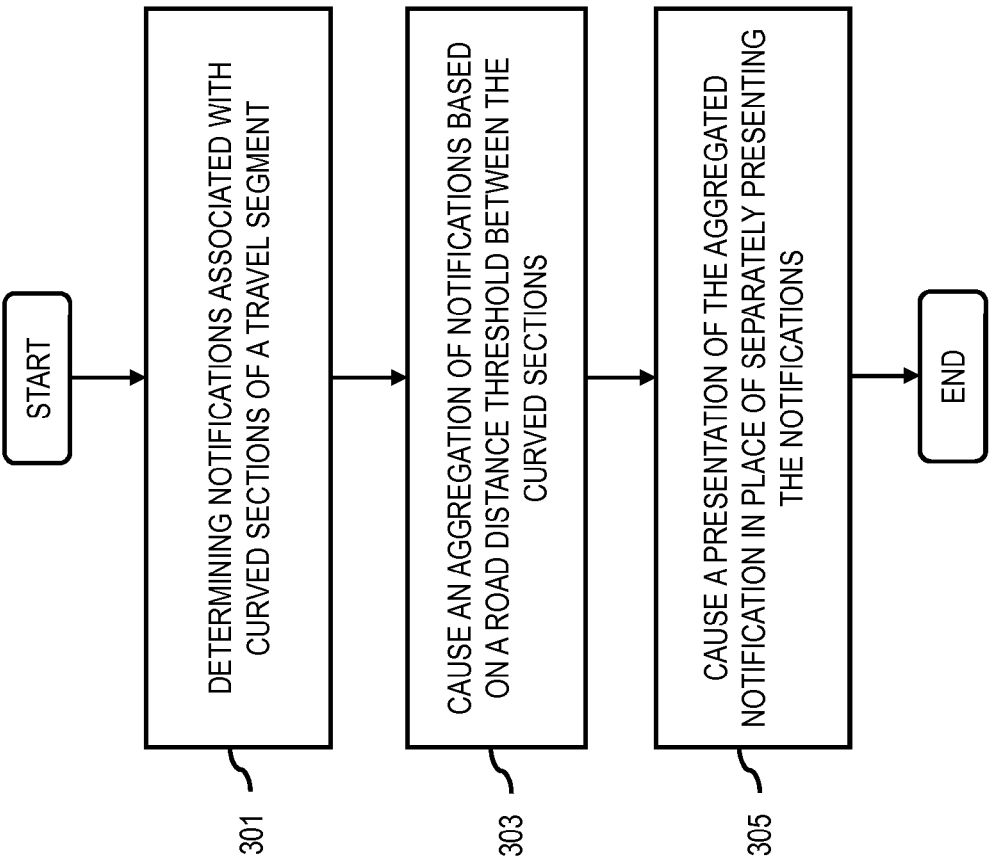
FIG. 3 is a flowchart of a process for providing aggregated notifications for travel segments, according to one embodiment.
Figure 14:
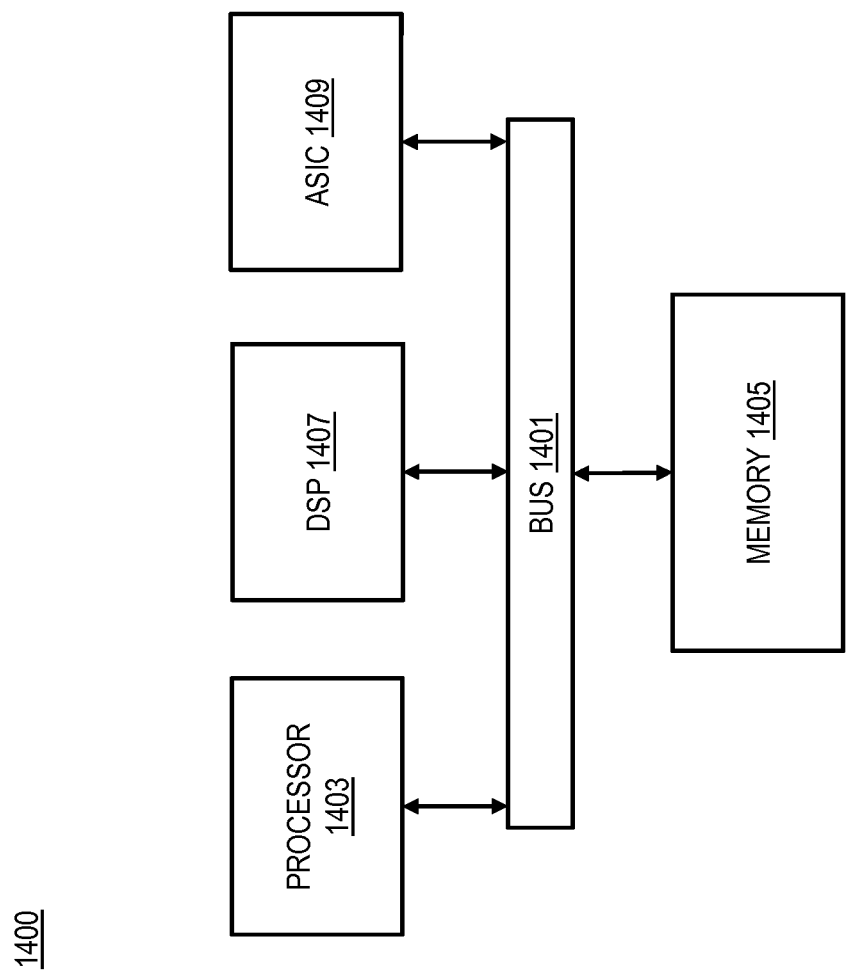
FIG. 14 is a diagram of a chip set that can be used to implement an embodiment of the invention.

FIG. 3 is a flowchart of a process for providing aggregated notifications for travel segments, according to one embodiment. In one embodiment, the notifications are determined by assessing distance and speed characteristics for one or more consecutive curves of at least one travel segment in order to estimate a safe, effective, and well timed set of one or more notifications, according to one embodiment. This may include causing an aggregation and/or presentation of a plurality of notifications for the one or more consecutive curves based on the travel segment parameters. Thus, the system 100 notifications will not be redundant, but include notifications at only the most safe and opportune times. In one embodiment, the vehicle configuration platform 107 performs the process 300 and is implemented in, for instance, a chip set including a processor and a memory as shown in FIG. 14. In addition or alternatively, the vehicle configuration module 105 can perform all or a portion of the process 300.

In step 301, the travel module 205 may determine a plurality of notifications associated with one or more curved sections of at least one travel segment. In one embodiment, the degree of road curvature is assessed by a given curvature threshold criterion to determine whether the curvature is sharp enough to be deemed dangerous. The travel segments of curvature greater than the threshold may be demarcated for notification.

In step 303, the vehicle configuration platform 107 may cause, at least in part, an aggregation of the plurality of notifications into at least one aggregated notification based, at least in part, on a road distance threshold between the one or more curved sections. In one embodiment, the notifications may be evaluated and aggregated using one or more thresholds including such parameters as distance to determine whether the relevant curved road travel segments may be aggregated for a singular notification. Likewise, other travel segment criteria may be substituted including vehicle travel times, average probe speeds, historic data, safe speeds, personal data inputs, and other such information. The system may also include crowd source data for grouping driven dangerous curve datasets into clusters based on relative frequencies and then determining the notifications using selection algorithms or other like process inputs. The distance, speed, and threshold parameters may be based on mapping data, crowd source data, network information, a combination thereof, or other like data sources, and can be evaluated via the travel module 205 using a variety of techniques, such as using on-board computer algorithms or network system algorithms.

In step 305, the vehicle configuration platform 107 may cause at least in part, a presentation of the at least one aggregated notification in place of separately presenting the plurality of notifications. Thus, the vehicle configuration platform 107 may aggregate the notifications so that the actual notifications are presented to ensure the user is aware that several dangerous curve segments are immediately ahead. In one embodiment, the notifications may be presented using an interactive display with audio, voice, and/or touch screen options. In one scenario, the system 100 may present relative degrees of danger to notify the user before the vehicle automatically compensates or, alternatively, allows the user to activate a manual control option. The notifications are thus presented to the user via the presentation module 213.

Figure 4:
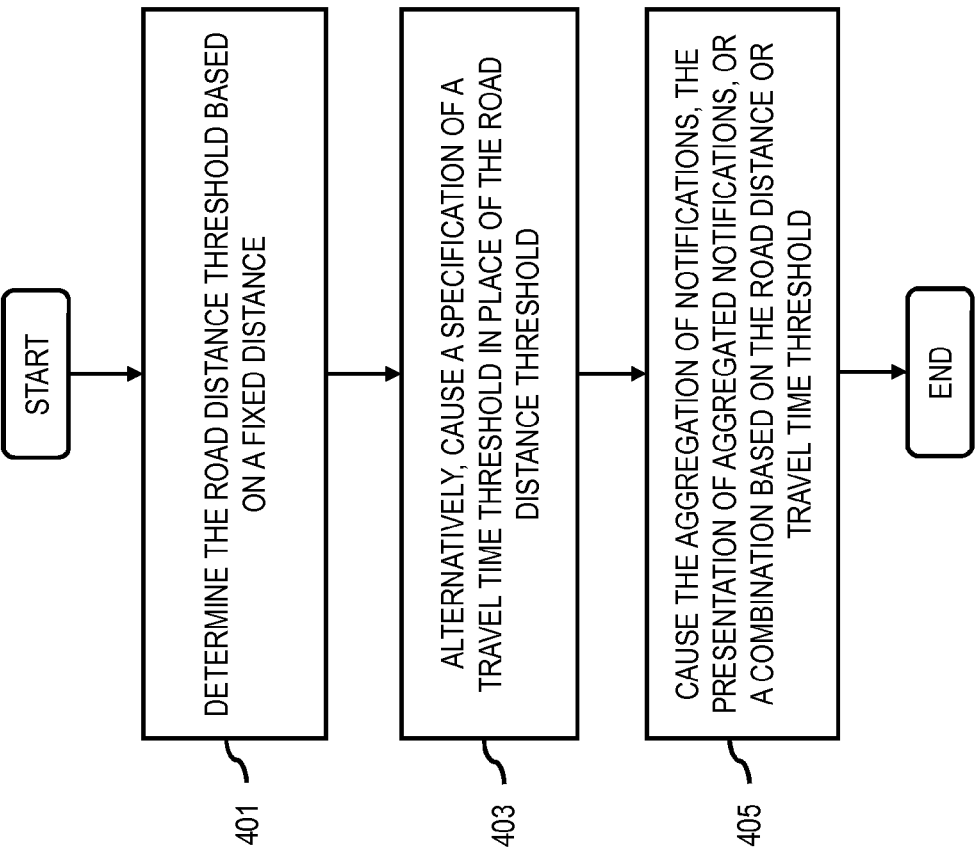
FIG. 4 is a flow chart of a process to cause the aggregation of the plurality of notifications, the presentation of the at least one aggregated notification, or a combination thereof based on the road distance or travel time threshold, according to one embodiment.

FIG. 4 is a flow chart of a process to cause the aggregation of the plurality of notifications, the presentation of the at least one aggregated notification, or a combination thereof based on the road distance or travel time threshold, according to one embodiment. In one embodiment, the vehicle configuration platform 107 performs the process 400 and is implemented in, for instance, a chip set including a processor and a memory as shown in FIG. 14. In addition or alternatively, the vehicle configuration module 105 can perform all or a portion of the process 400.

In step 401, the vehicle configuration platform 107 may determine the road distance threshold for the one or more consecutive curves of the at least one travel segment. In one embodiment, the dangerous curve travel segments are assessed as potential problem areas in which the vehicle may have to provide a notification based on the curvature of the road. In one scenario, the degree of curvature is assessed to determine whether the curvature is sharp enough to be deemed dangerous by a given curvature threshold criteria. In one embodiment, a threshold for aggregation may be determined as a travel distance between two or more dangerous curve notification areas.

In step 403, the vehicle configuration platform 107 may cause an aggregation of the plurality of notifications for the one or more consecutive curves with distance less than or equal to the road distance threshold. In one embodiment, the threshold for notification may be determined as a travel distance between two or more dangerous curve notification areas. Thus, two or more dangerous curve segments spaced closer than a threshold distance will be given only one notification for the given threshold distance and thus require an aggregated notification for multiple dangerous curves within the threshold distance. This actual notification may be given at the location of the first notification of the series of consecutive curves to warn the user. In another scenario, the given notifications may be spaced at a distance greater than the threshold distance and thus require an actual notification for each dangerous curve travel segment.

In an example use case, fixed distance aggregation may be used as a strategy that considers a road distance threshold and provides notifications for dangerous curves that are within a fix road distance from each other, and consequently are aggregated into one notification if the curves are less than the threshold distance apart. For example, assuming a road distance threshold of 200 m, any dangerous curve notifications that are along the travel segment of a driver will be aggregated if the said dangerous curves are less than 200 m apart in terms of road distance. Thus in FIG. 9, the dangerous curve notifications for DC2 and DC3 would be merged into 1. Consequently, the driver only receives two dangerous curve notifications. The first is for DC1 and then a second for both DC2 and DC3. The first notification is generated before the driver navigates DC1 and the second notification is generated before the driver navigates DC2. There is no notification for DC3 since it is less than the threshold distance from DC2.

Figure 5:
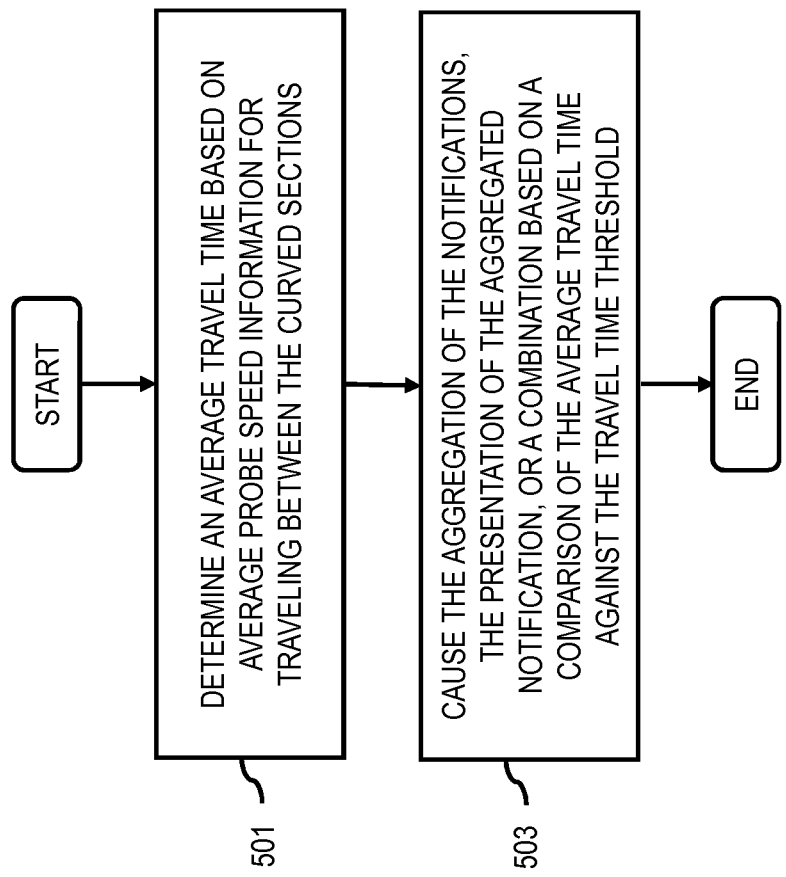
FIG. 5 is a flowchart of process to cause the aggregation of the plurality of notifications, the presentation of the at least one aggregated notification, or a combination thereof is based, at least in part, on a comparison of the average travel time against the travel time threshold, according to one embodiment.

FIG. 5 is a flowchart of process to cause the aggregation of the plurality of notifications, the presentation of the at least one aggregated notification, or a combination thereof is based, at least in part, on a comparison of the average travel time against the travel time threshold, according to one embodiment. In one embodiment, the vehicle configuration platform 107 performs the process 500 and is implemented in, for instance, a chip set including a processor and a memory as shown in FIG. 14. In addition or alternatively, the vehicle configuration module 105 can perform all or a portion of the process 500.

In step 501, the vehicle configuration platform 107 may determine an average travel time based, at least in part, on average probe speed information for traveling one or more distances between the one or more curved sections. In one embodiment, the average probe speed may be calculated from historic travel time data using historic probes from different probe vehicles that are map-matched to the travel segments. The average probe speed gives a speed from a compilation of driven data and comprises a "humanized" average behavior.

Figure 9:
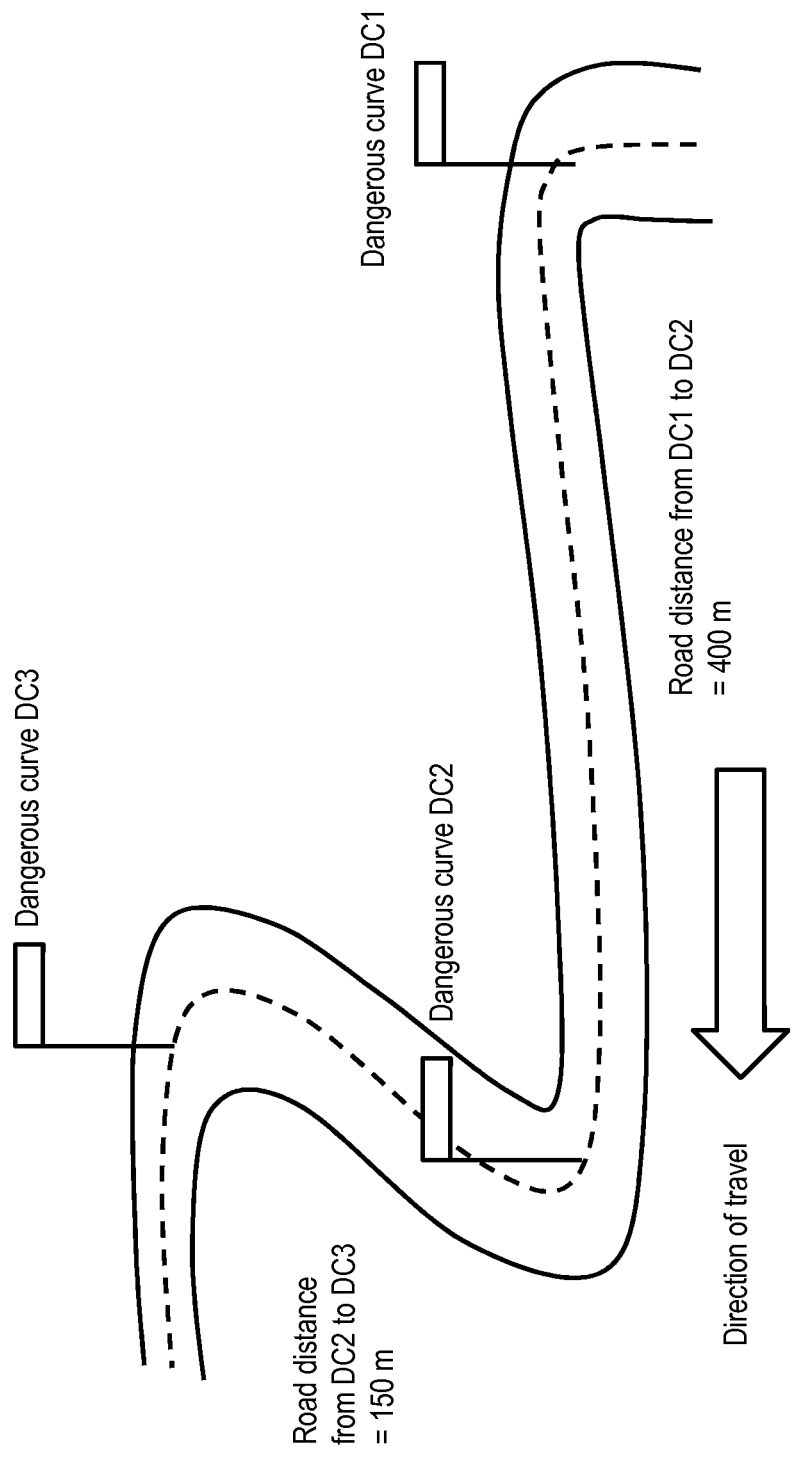
FIG. 9 is an illustration of a road travel segment with a plurality of notifications for one or more consecutive dangerous curves and an aggregation of the notifications based on a fixed distance threshold, according to one embodiment.

In step 503, the vehicle configuration platform 107 may cause the aggregation of the plurality of notifications, the presentation of the at least one aggregated notification, or a combination thereof is based, at least in part, on a comparison of the average travel time against the travel time threshold. In one embodiment, the vehicle configuration platform 107 can map the potential notifications, compare the travel times calculated from the average probe speed to some threshold, and subsequently map the aggregated notifications for one or more consecutive dangerous curves. The computation is illustrated in FIG. 9 and may be achieved as follows:

$$\text{time} = \frac{D}{\text{average probe speed}}$$

D is the distance between two consecutive curves. If the computed time is less than a threshold, then one dangerous curve notification is provided for the two consecutive curves. For example, the threshold is 25 seconds. The average probe speed between DC2 and DC3 is 2 meters per second and the distance is 150 m. Also, the average probe speed between DC1 and DC2 is 20 meters per second and the distance is 400 m.

Between DC2 and DC3, $$\text{time} = \frac{150}{2} = 75 \text{ seconds}$$

Between DC1 and DC2, $$\text{time} = \frac{400}{20} = 20 \text{ seconds}$$

Since the threshold is 25 seconds, then the notifications for DC1 and DC2 are merged. Subsequently, only two notifications are sent. The first is sent before the driver negotiates DC1 and is valid for both DC1 and DC2. The second notification is sent after the driver negotiates DC2 but before DC3. The average speed between DC1 and DC2 is faster even though the distance is longer, by the time the driver passes DC1 it will take him 20 seconds to get to DC2 so a new notification is not necessary. On the other hand, the segment between DC2 and DC3 is shorter but slower in terms of speed. When the driver passes DC2, it will take him 75 seconds to get to DC3 so a new notification is needed.

Figure 6:
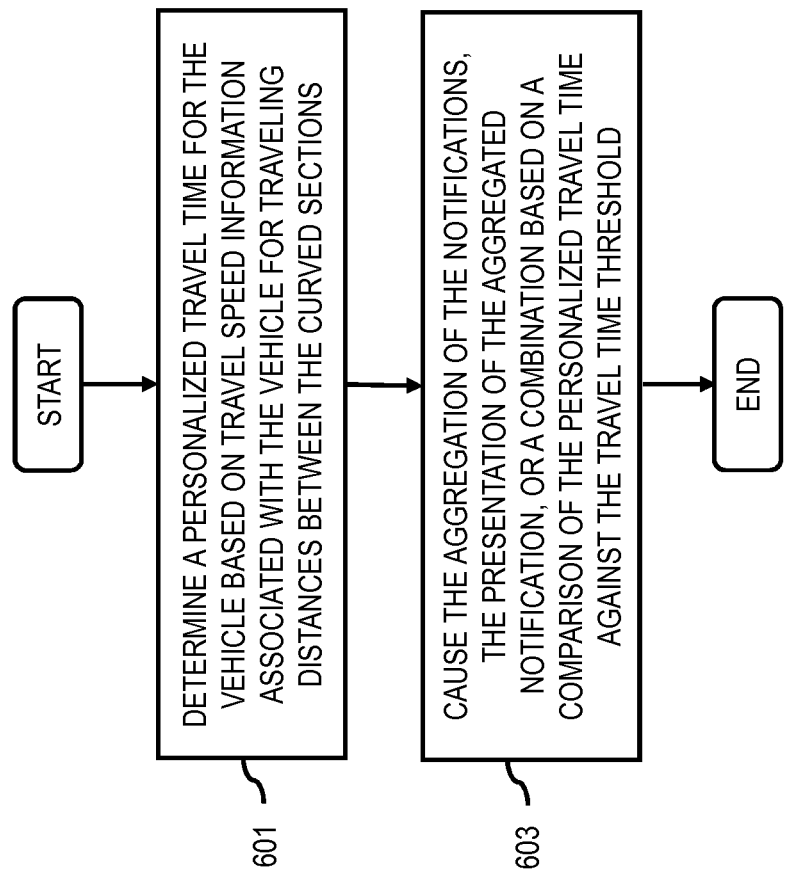
FIG. 6 is a flowchart of a causing, at least in part, the aggregation of the plurality of notifications, the presentation of the at least one aggregated notification, or a combination thereof is based, at least in part, on a comparison of the personalized travel time against the travel time threshold, according to one embodiment.

FIG. 6 is a flowchart for a process to cause an aggregation of the plurality of notifications, the presentation of the at least one aggregated notification, or a combination thereof based, at least in part, on a comparison of the personalized travel time against the travel time threshold between the one or more curved sections, according to one embodiment. In one embodiment, the vehicle configuration platform 107 performs the process 600 and is implemented in, for instance, a chip set including a processor and a memory as shown in FIG. 14. In addition or alternatively, the vehicle configuration module 105 can perform all or a portion of the process 600.

In step 601, the vehicle configuration platform 107 may determine a personalized travel time for the at least one vehicle based, at least in part, on travel speed information associated with the at least one vehicle for traveling one or more distances between the one or more curved sections. In one embodiment, the vehicle configuration platform 107 may track the at least one vehicle's speed and use this speed to calculate a travel time for the one or more dangerous curve travel segments. In one scenario, the vehicle configuration platform 107 may determine whether this travel time is less than a threshold travel time and then aggregate the notifications accordingly. In one embodiment, the vehicle configuration platform 107 may track the at least one vehicle's historical, current, or predicted speed using a variety of means including historical data, sensor data, network data, and other like means. Thus determined, this speed can be used to calculate a travel time for the one or more dangerous curve travel segments.

In step 603, the vehicle configuration platform 107 may cause the aggregation of the plurality of notifications, the presentation of the at least one aggregated notification, or a combination thereof is based, at least in part, on a comparison of the personalized travel time against the travel time threshold. In one embodiment, the personalized time for the vehicle can be based on the current speed of the at least one vehicle measured using a variety of means including on-board sensors, real-time data, communication networks and other like means. In one scenario, the personalized travel time can be personalized to the at least one vehicle. In another scenario, the personalized travel time may take into account user characteristics as well as the current speed travel time to be modified. In such manner, factors including age, gender, demographic information, personal preferences, and other like information can be used to modify, in part, the vehicle's projected travel time. In one embodiment, the personalized travel time for the vehicle can be based on a personalized distance threshold for the at least one vehicle. The personalized travel segment parameters can likewise be based on one or more user preferences and/or characteristics.

Figure 10:
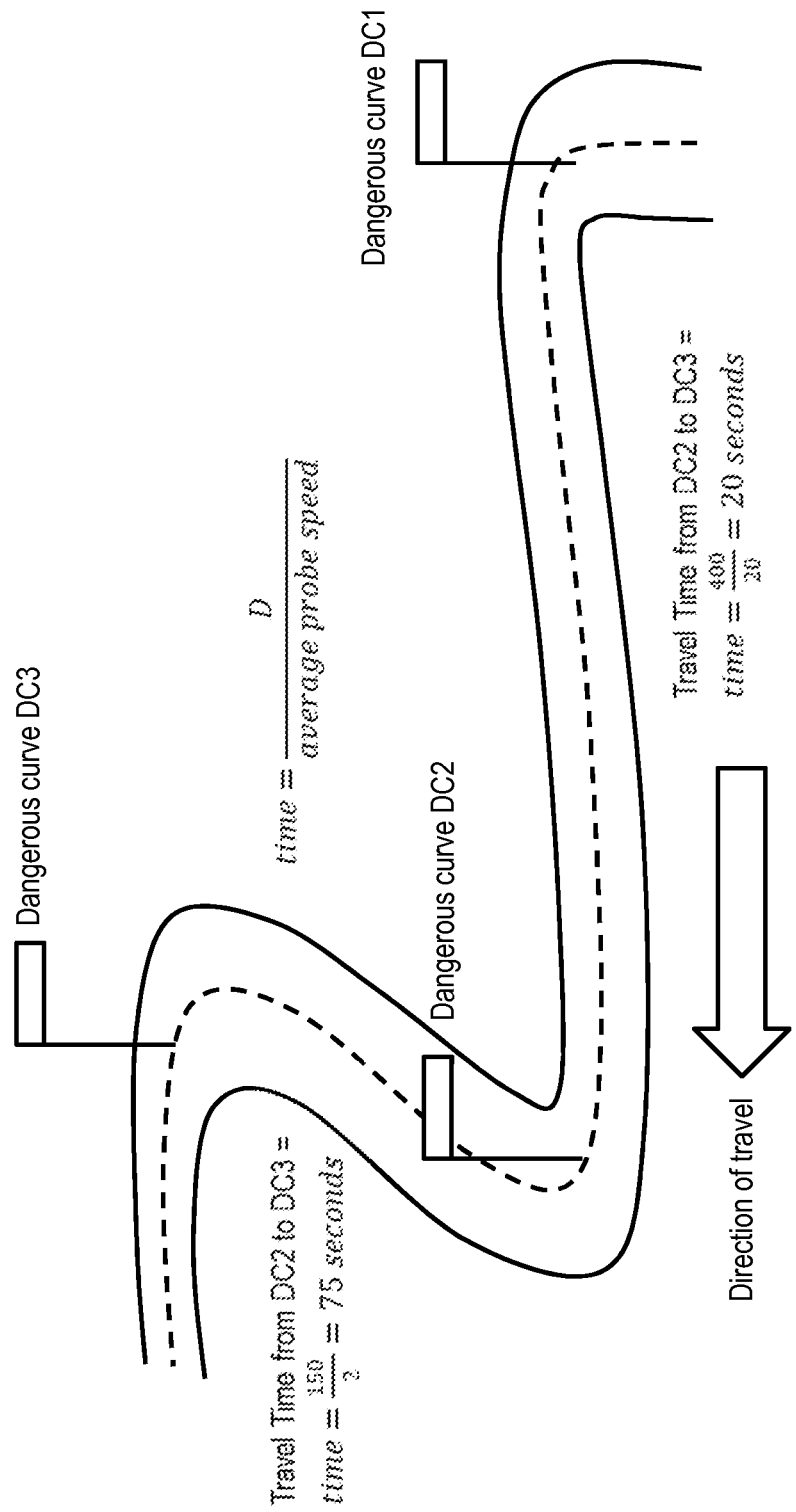
FIG. 10 is an illustration of a road travel segment with a plurality of notifications for one or more consecutive dangerous curves and an aggregation of the notifications based on an average probe speed threshold, according to one embodiment.

In one example use case of this technique as illustrated in FIG. 10, the current speed of the vehicle is taken into consideration. Since the current vehicle speed is utilized, the model becomes personalized and the number of notifications depends on the driver. For the other two models (i.e. fixed distance and variable distance (travel time variable on probe/historic data)) every driver receives the same amount of notifications if they are travelling on the same road segment and in the same direction. In this model, the current vehicle speed is used as follows:

$$\text{time} = \frac{D}{\text{current vehicle speed}}$$

The vehicle configuration platform 107 may compare the computed time to a threshold and if the computed time is less than the threshold, then we merge the notifications for the two upcoming curves. For example, assume a threshold of 25 seconds and assume two drivers: (1) driver1 that is driving at 5 meters per second, (2) driver2 that is driving at 15 meters per second.

For driver 1
For the segment DC1 to DC2, $$\text{time} = \frac{400}{5} = 80 \text{ seconds}$$

For the segment DC2 to DC3, $$\text{time} = \frac{150}{5} = 30 \text{ seconds}$$

Thus, for driver 1, there is no notification aggregation and driver 1 receives three notifications because he is driving slowly.

For driver 2

For the segment DC1 to DC2, $$\text{time} = \frac{400}{15} = 27 \text{ seconds}$$

For the segment DC2 to DC3, $$\text{time} = \frac{150}{15} = 10 \text{ seconds}$$

Thus, for driver 2, there is a notification aggregation and driver 2 receives a total of two notifications because the notifications for DC2 and DC3 are aggregated since it takes 10 seconds and the threshold is 25 seconds.

Figure 7:
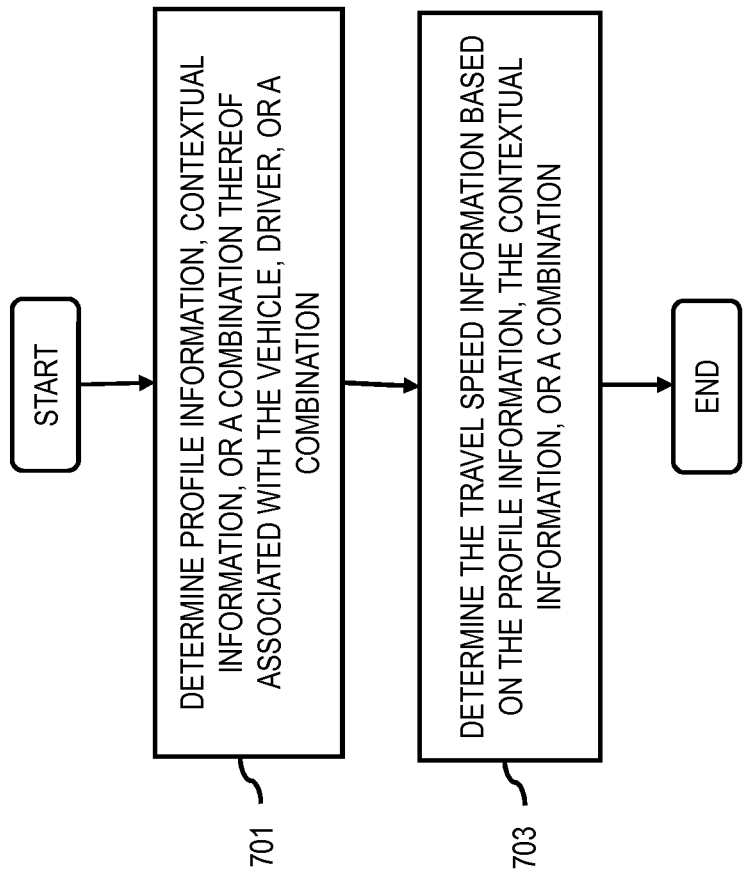
FIG. 7 is a flowchart of a process for determining the travel speed information based, at least in part, on the profile information, the contextual information, or a combination thereof, according to one embodiment.

FIG. 7 is a flowchart for determining the travel speed information based, at least in part, on the profile information, the contextual information, or a combination thereof, according to one embodiment. In one embodiment, the vehicle configuration platform 107 performs the process 700 and is implemented in, for instance, a chip set including a processor and a memory as shown in FIG. 14. In addition or alternatively, the vehicle configuration module 105 can perform all or a portion of the process 700.

In step 701, the vehicle configuration platform 107 may determine profile information, contextual information, or a combination thereof associated with the at least one vehicle, at least one driver of the at least one vehicle, or a combination thereof. In one embodiment, the vehicle configuration platform 107 may calculate travel time or travel distance based on profile information. Such profile information may include age, gender, health, professional information, other demographic information, historic data, and other personalized data to estimate a travel time. The travel time/distance information and threshold data may be map-matched to particular travel segments. Thus determined, the travel time can be used to calculate an aggregated notification or presentation of an aggregated notification for the one or more dangerous curve travel segments.

In step 703, the vehicle configuration platform 107 may determine the travel speed information based, at least in part, on the profile information, the contextual information, or a combination thereof. In one embodiment, the travel time for the vehicle can be based on personalized profile information gathered from one or more sources and updated using real-time data, on-board sensors, communication networks and other like means. In one scenario, a profile based travel time can be localized to the at least one vehicle traveling the at least one travel segment. In another scenario, a profile based travel time may take into account user characteristics to modify a historical, current, or predicted travel time. In one scenario, the vehicle configuration platform 107 may determine whether the profile based travel time is less than a threshold travel time and then aggregate the notifications accordingly.

Figure 8:
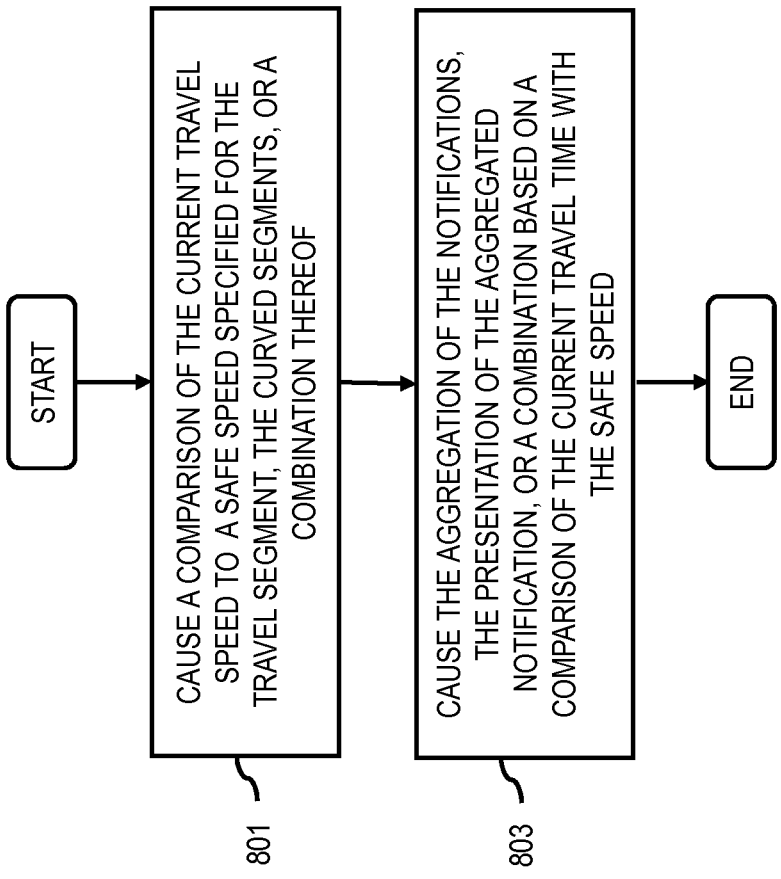
FIG. 8 is a flowchart of a process for causing, at least in part, a comparison of the current travel speed to at least one safe speed specified for the at least one travel segment, the one or more curved segments, or a combination thereof to determine whether to cause, at least in part, an initiation of the aggregation of the plurality of notifications, the presentation of the at least one aggregated notification, or a combination thereof, according to one embodiment.

FIG. 8 is a flowchart for causing, at least in part, a comparison of the current travel speed to at least one safe speed specified for the at least one travel segment, the one or more curved segments, or a combination thereof to determine whether to cause, at least in part, an initiation of the aggregation of the plurality of notifications, the presentation of the at least one aggregated notification, or a combination thereof, according to one embodiment. In one embodiment, the vehicle configuration platform 107 performs the process 800 and is implemented in, for instance, a chip set including a processor and a memory as shown in FIG. 14. In addition or alternatively, the vehicle configuration module 105 can perform all or a portion of the process 800.

In step 801, the vehicle configuration platform 107 may cause, at least in part, a comparison of the current travel speed to at least one safe speed specified for the at least one travel segment, the one or more curved segments, or a combination thereof. In one embodiment, the vehicle configuration platform 107 may provide a safe speed threshold using a variety of means including mapping data, speed limit data, preprogrammed on-board automated algorithms, historical data, sensor data, network data, and other like means. Thus determined, this safe speed threshold can be compared with a current vehicle speed of the user and only if the vehicle speed (current speed) is higher than the safe speed will a notification be sent. Alternatively, the system 100 may determine whether the current vehicle speed travel time is less than a safe speed travel time and then notify the user only if the current speed travel time is less than the threshold safe travel time. In one scenario, the safe speed travel time can be personalized to the individual user or localized to the at least one vehicle traveling the at least one travel segment. In such manner, personalized factors including age, gender, health, other demographic information, personal preferences, and other like information can be used to modify, at least in part, the vehicle's safe speed travel time.

In step 803, the vehicle configuration platform 107 may cause, at least in part, an initiation of the aggregation of the plurality of notifications, the presentation of the at least one aggregated notification, or a combination thereof, according to one embodiment. In one embodiment, the threshold for notification may be determined as a safe speed or travel time for one or more dangerous curve notification areas. In one scenario, the notification may only be sent if the vehicle speed (current speed) is higher than the safe speed. In another scenario, the current speed may be less than a threshold speed and thus not require a notification. In one scenario, the vehicle configuration platform 107 may determine whether the current vehicle speed travel time is less than a safe speed travel time and then aggregate the notifications accordingly.

FIG. 9 is an illustration of a road travel segment with dangerous curves, according to one embodiment. In one embodiment, three of the dangerous curves DC1 [901], DC2 [903], and DC3 [905] may be of a threshold curvature great enough to warrant a notification. In one scenario, two or all of the curves may be within either a predetermined threshold distance or threshold travel time to aggregate two or three notifications into one or two actual notifications, respectively. Thus, the user may receive one or more notifications before the dangerous curves. These notifications may be audible, voice activated, on a visual display, seat vibrations, or a combination thereof as well as use other like means.

FIG. 10 is an illustration of a road travel segment with dangerous curves, according to one embodiment. In one embodiment, three of the dangerous curves DC1 [1001], DC2 [1003], and DC3 [1005] may be of a threshold curvature great enough to warrant a notification. In one scenario, two or all of the curves may be within a probe speed threshold travel time to aggregate two or three notifications into one or two actual notifications, respectively. Thus, the user may receive a one or more notifications before the dangerous curves. These notifications may be audible, voice activated, a visual display, seat vibrations, or a combination thereof as well as use other like means.

FIG. 11 is an illustration of a road travel segment with dangerous curves, according to one embodiment. In one embodiment, three of the dangerous curves DC1 [1101], DC2 [1103], and DC3 [1105] may be of a threshold curvature great enough to warrant a notification. In one scenario, two or all of the curves may be within either a current vehicle speed threshold travel time to aggregate two or three notifications into one or two actual notifications, respectively. Thus, the user may receive one or more notifications before the dangerous curves. These notifications may be audible, voice activated, on a visual display, seat vibrations, or a combination thereof as well as use other like means.

Figure 12:
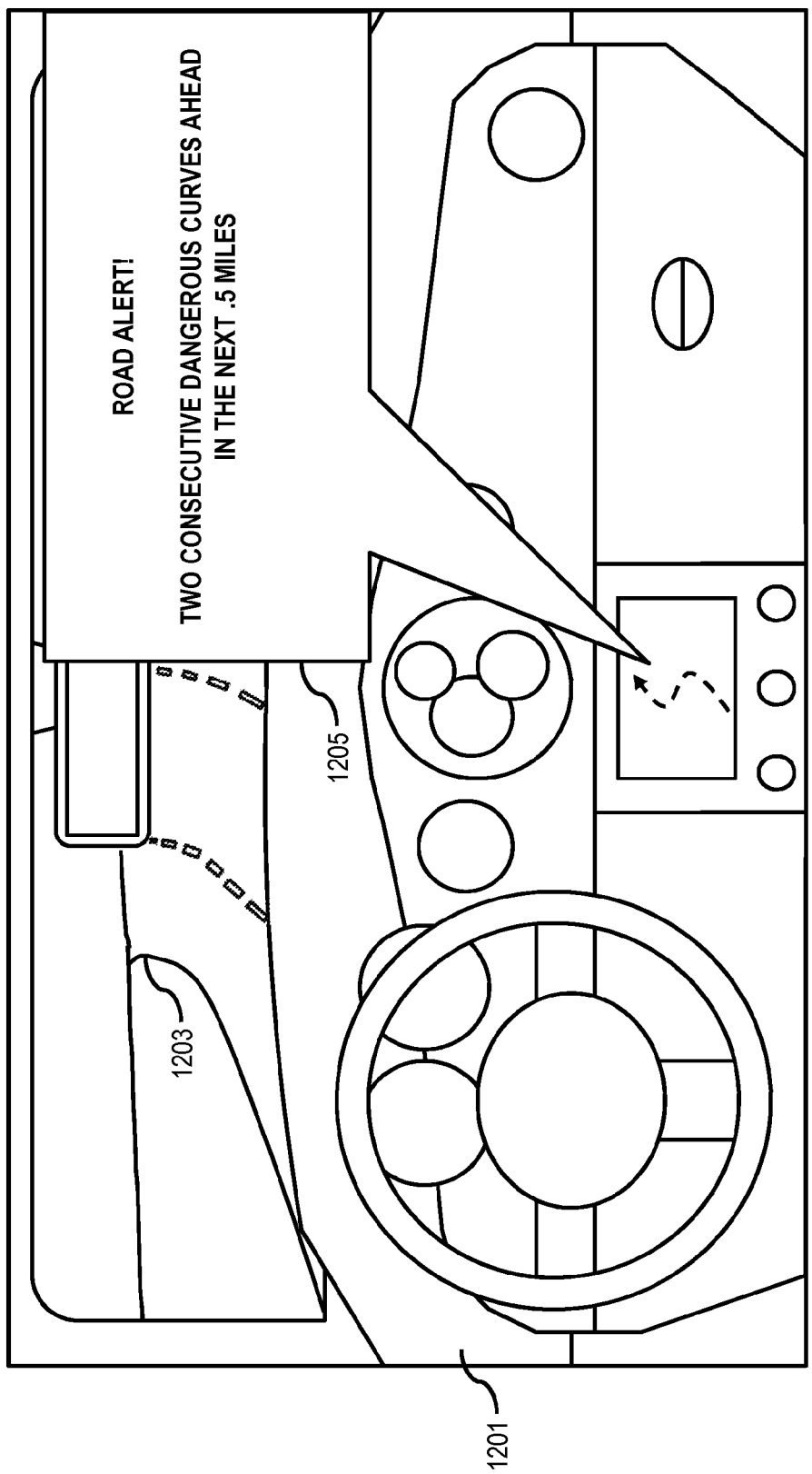
FIG. 12 is a user interface diagram illustrating an example of aggregated notifications, according to one embodiment.

FIG. 12 is a user interface diagram illustrating an example of aggregated notifications, according to one embodiment. In the example of FIG. 12, a vehicle [1201] is equipped with a vehicle configuration platform 107 for aggregating notification for travel segments and is traveling along a road segment 1203 that includes multiple dangerous curves (e.g., two dangerous curves). As the vehicle [1201] approaches a notification point for the first curve, the vehicle configuration platform 107 queries for the locations of subsequent curves and/or related notifications along the road segment [1203] (e.g., using the processes described above).

In this example, the vehicle configuration platform 107 determines that there are two consecutive curves that fall within a predetermined distance threshold for aggregation. Alternatively, as previously described, the vehicle configuration platform 107 can use any other means to determine whether to aggregate multiple notifications (e.g., a generalized time or distance threshold, a personalized time or distance threshold based on the speed of the vehicle [1201], etc.). Accordingly, the vehicle configuration platform 107 initiates a presentation of an aggregated notification [1205] that indicates that there are "Two Consecutive Dangerous Curves Ahead in the Next 0.5 Miles".

In this example, the aggregated notification [1205] includes information on the number of aggregated notifications (e.g., two) as well as the distance covered by the aggregated notification (e.g., 0.5 miles). In other embodiments, the aggregated notification can include more detailed notifications (e.g., diagrams of the curves, pictures of the upcoming curves, etc.) or less detailed information (e.g., indicating only that "Dangerous curves are ahead").

The processes described herein for providing aggregated notifications for travel segments may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 13:
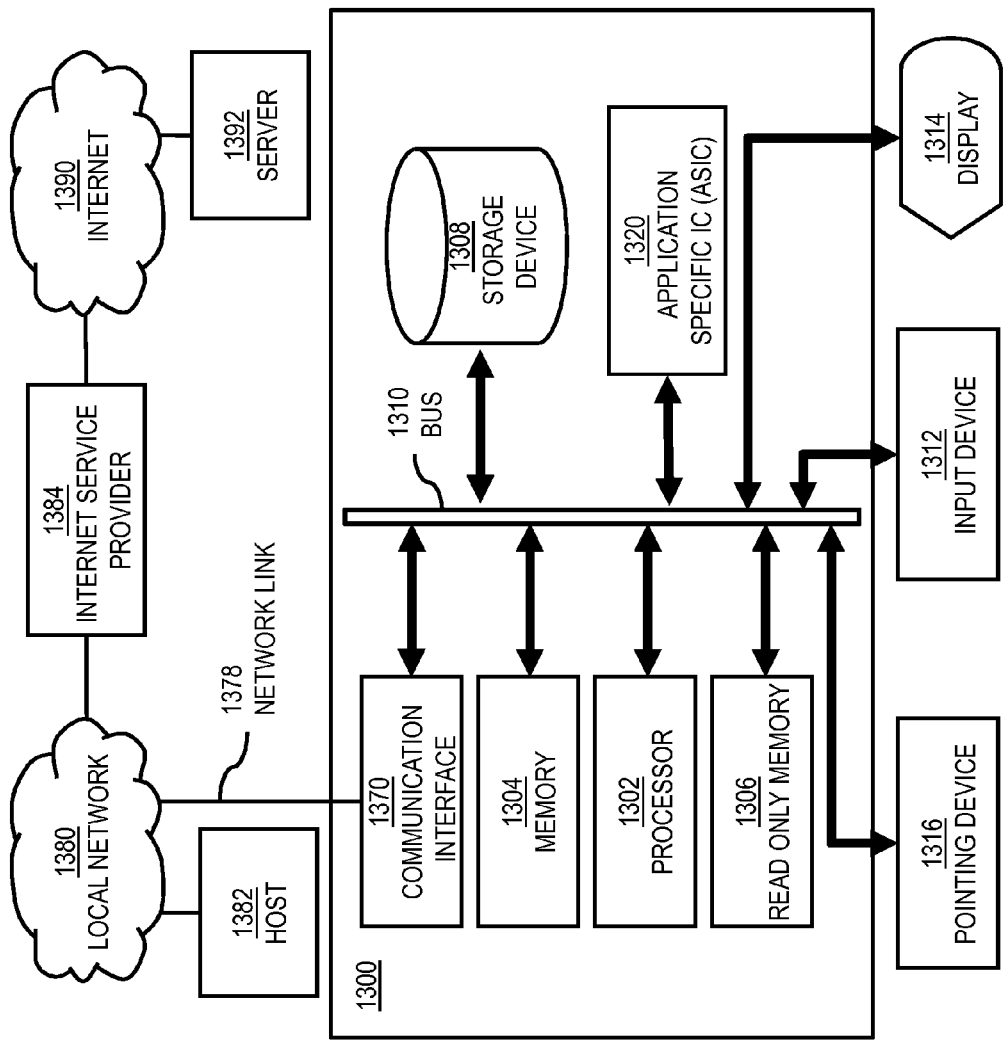
FIG. 13 is a diagram of hardware that can be used to implement an embodiment of the invention.

FIG. 13 illustrates a computer system 1300 upon which an embodiment of the invention may be implemented. Although computer system 1300 is depicted with respect to a particular device or equipment, it is contemplated that other devices or equipment (e.g., network elements, servers, etc.) within FIG. 13 can deploy the illustrated hardware and components of system 1300. Computer system 1300 is programmed (e.g., via computer program code or instructions) to provide aggregated notifications for travel segments as described herein and includes a communication mechanism such as a bus 1310 for passing information between other internal and external components of the computer system 1300. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1300, or a portion thereof, constitutes a means for performing one or more steps of providing aggregated notifications for travel segments.

A bus 1310 includes one or more parallel conductors of information so that information is transferred quickly among devices coupled to the bus 1310. One or more processors 1302 for processing information are coupled with the bus 1310.

A processor (or multiple processors) 1302 performs a set of operations on information as specified by computer program code related to providing aggregated notifications for travel segments. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1310 and placing information on the bus 1310. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1302, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1300 also includes a memory 1304 coupled to bus 1310. The memory 1304, such as a random access memory (RAM) or any other dynamic storage device, stores information including processor instructions for providing aggregated notifications for travel segments. Dynamic memory allows information stored therein to be changed by the computer system 1300. RAM allows a unit of information stored at a location called a memory address to be stored and retrieved independently of information at neighboring addresses. The memory 1304 is also used by the processor 1302 to store temporary values during execution of processor instructions. The computer system 1300 also includes a read only memory (ROM) 1306 or any other static storage device coupled to the bus 1310 for storing static information, including instructions, that is not changed by the computer system 1300. Some memory is composed of volatile storage that loses the information stored thereon when power is lost. Also coupled to bus 1310 is a non-volatile (persistent) storage device 1308, such as a magnetic disk, optical disk or flash card, for storing information, including instructions, that persists even when the computer system 1300 is turned off or otherwise loses power.

Information, including instructions for providing aggregated notifications for travel segments is provided to the bus 1310 for use by the processor from an external input device 1312, such as a keyboard containing alphanumeric keys operated by a human user, or a sensor. A sensor detects conditions in its vicinity and transforms those detections into physical expression compatible with the measurable phenomenon used to represent information in computer system 1300. Other external devices coupled to bus 1310, used primarily for interacting with humans, include a display device 1314, such as a cathode ray tube (CRT), a liquid crystal display (LCD), a light emitting diode (LED) display, an organic LED (OLED) display, a plasma screen, or a printer for presenting text or images, and a pointing device 1316, such as a mouse, a trackball, cursor direction keys, or a motion sensor, for controlling a position of a small cursor image presented on the display 1314 and issuing commands associated with graphical elements presented on the display 1314. In some embodiments, for example, in embodiments in which the computer system 1300 performs all functions automatically without human input, one or more of external input device 1312, display device 1314 and pointing device 1316 is omitted.

In the illustrated embodiment, special purpose hardware, such as an application specific integrated circuit (ASIC) 1320, is coupled to bus 1310. The special purpose hardware is configured to perform operations not performed by processor 1302 quickly enough for special purposes. Examples of ASICs include graphics accelerator cards for generating images for display 1314, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1300 also includes one or more instances of a communications interface 1370 coupled to bus 1310. Communication interface 1370 provides a one-way or two-way communication coupling to a variety of external devices that operate with their own processors, such as printers, scanners and external disks. In general the coupling is with a network link 1378 that is connected to a local network 1380 to which a variety of external devices with their own processors are connected. For example, communication interface 1370 may be a parallel port or a serial port or a universal serial bus (USB) port on a personal computer. In some embodiments, communications interface 1370 is an integrated services digital network (ISDN) card or a digital subscriber line (DSL) card or a telephone modem that provides an information communication connection to a corresponding type of telephone line. In some embodiments, a communication interface 1370 is a cable modem that converts signals on bus 1310 into signals for a communication connection over a coaxial cable or into optical signals for a communication connection over a fiber optic cable. As another example, communications interface 1370 may be a local area network (LAN) card to provide a data communication connection to a compatible LAN, such as Ethernet. Wireless links may also be implemented. For wireless links, the communications interface 1370 sends or receives or both sends and receives electrical, acoustic or electromagnetic signals, including infrared and optical signals, that carry information streams, such as digital data. For example, in wireless handheld devices, such as mobile telephones like cell phones, the communications interface 1370 includes a radio band electromagnetic transmitter and receiver called a radio transceiver. In certain embodiments, the communications interface 1370 enables connection to the communication network 109 for providing aggregated notifications for travel segments to the UE 103.

The term "computer-readable medium" as used herein refers to any medium that participates in providing information to processor 1302, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1308. Volatile media include, for example, dynamic memory 1304. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1320.

Network link 1378 typically provides information communication using transmission media through one or more networks to other devices that use or process the information. For example, network link 1378 may provide a connection through local network 1380 to a host computer 1382 or to equipment 1384 operated by an Internet Service Provider (ISP). ISP equipment 1384 in turn provides data communication services through the public, world-wide packet-switching communication network of networks now commonly referred to as the Internet 1390.

A computer called a server host 1392 connected to the Internet hosts a process that provides a service in response to information received over the Internet. For example, server host 1392 hosts a process that provides information representing video data for presentation at display 1314. It is contemplated that the components of system 1300 can be deployed in various configurations within other computer systems, e.g., host 1382 and server 1392.

At least some embodiments of the invention are related to the use of computer system 1300 for implementing some or all of the techniques described herein. According to one embodiment of the invention, those techniques are performed by computer system 1300 in response to processor 1302 executing one or more sequences of one or more processor instructions contained in memory 1304. Such instructions, also called computer instructions, software and program code, may be read into memory 1304 from another computer-readable medium such as storage device 1308 or network link 1378. Execution of the sequences of instructions contained in memory 1304 causes processor 1302 to perform one or more of the method steps described herein. In alternative embodiments, hardware, such as ASIC 1320, may be used in place of or in combination with software to implement the invention. Thus, embodiments of the invention are not limited to any specific combination of hardware and software, unless otherwise explicitly stated herein.

The signals transmitted over network link 1378 and other networks through communications interface 1370, carry information to and from computer system 1300. Computer system 1300 can send and receive information, including program code, through the networks 1380, 1390 among others, through network link 1378 and communications interface 1370. In an example using the Internet 1390, a server host 1392 transmits program code for a particular application, requested by a message sent from computer 1300, through Internet 1390, ISP equipment 1384, local network 1380 and communications interface 1370. The received code may be executed by processor 1302 as it is received, or may be stored in memory 1304 or in storage device 1308 or any other non-volatile storage for later execution, or both. In this manner, computer system 1300 may obtain application program code in the form of signals on a carrier wave.

Various forms of computer readable media may be involved in carrying one or more sequence of instructions or data or both to processor 1302 for execution. For example, instructions and data may initially be carried on a magnetic disk of a remote computer such as host 1382. The remote computer loads the instructions and data into its dynamic memory and sends the instructions and data over a telephone line using a modem. A modem local to the computer system 1300 receives the instructions and data on a telephone line and uses an infra-red transmitter to convert the instructions and data to a signal on an infra-red carrier wave serving as the network link 1378. An infrared detector serving as communications interface 1370 receives the instructions and data carried in the infrared signal and places information representing the instructions and data onto bus 1310. Bus 1310 carries the information to memory 1304 from which processor 1302 retrieves and executes the instructions using some of the data sent with the instructions. The instructions and data received in memory 1304 may optionally be stored on storage device 1308, either before or after execution by the processor 1302.

FIG. 14 illustrates a chip set or chip 1400 upon which an embodiment of the invention may be implemented. Chip set 1400 is programmed to provide aggregated notifications for travel segments as described herein and includes, for instance, the processor and memory components described with respect to FIG. 13 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1400 can be implemented in a single chip. It is further contemplated that in certain embodiments the chip set or chip 1400 can be implemented as a single "system on a chip." It is further contemplated that in certain embodiments a separate ASIC would not be used, for example, and that all relevant functions as disclosed herein would be performed by a processor or processors. Chip set or chip 1400, or a portion thereof, constitutes a means for performing one or more steps of providing user interface navigation information associated with the availability of functions. Chip set or chip 1400, or a portion thereof, constitutes a means for performing one or more steps of providing aggregated notifications for travel segments.

In one embodiment, the chip set or chip 1400 includes a communication mechanism such as a bus 1401 for passing information among the components of the chip set 1400. A processor 1403 has connectivity to the bus 1401 to execute instructions and process information stored in, for example, a memory 1405. The processor 1403 may include one or more processing cores with each core configured to perform independently. A multi-core processor enables multiprocessing within a single physical package. Examples of a multi-core processor include two, four, eight, or greater numbers of processing cores. Alternatively or in addition, the processor 1403 may include one or more microprocessors configured in tandem via the bus 1401 to enable independent execution of instructions, pipelining, and multithreading. The processor 1403 may also be accompanied with one or more specialized components to perform certain processing functions and tasks such as one or more digital signal processors (DSP) 1407, or one or more application-specific integrated circuits (ASIC) 1409. A DSP 1407 typically is configured to process real-world signals (e.g., sound) in real time independently of the processor 1403. Similarly, an ASIC 1409 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1400 includes merely one or more processors and some software and/or firmware supporting and/or relating to and/or for the one or more processors.

The processor 1403 and accompanying components have connectivity to the memory 1405 via the bus 1401. The memory 1405 includes both dynamic memory (e.g., RAM, magnetic disk, writable optical disk, etc.) and static memory (e.g., ROM, CD-ROM, etc.) for storing executable instructions that when executed perform the inventive steps described herein to provide aggregated notifications for travel segments. The memory 1405 also stores the data associated with or generated by the execution of the inventive steps.

Figure 15:
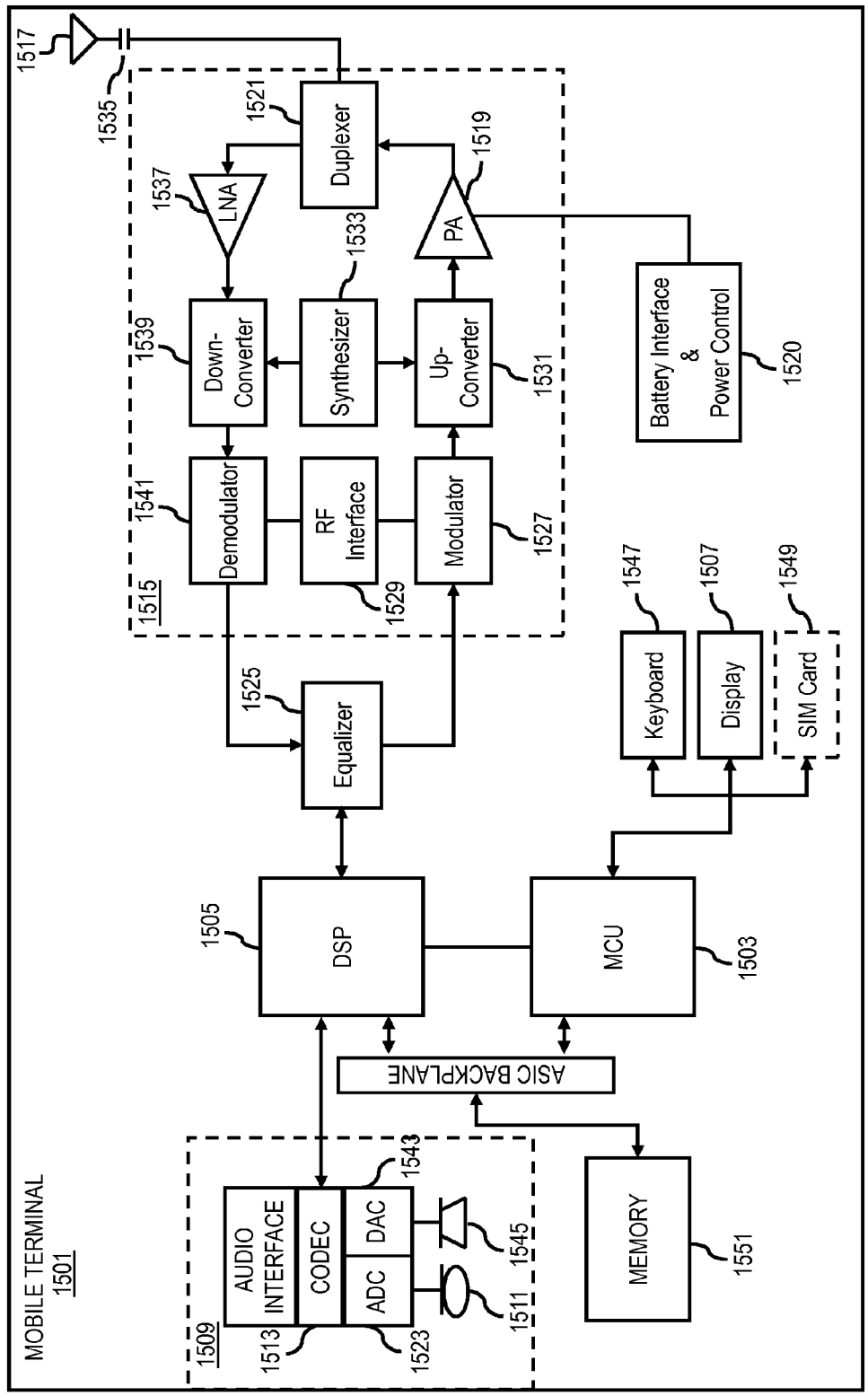
FIG. 15 is a diagram of a mobile terminal (e.g., handset) that can be used to implement an embodiment of the invention.

FIG. 15 is a diagram of exemplary components of a mobile terminal (e.g., handset) for communications, which is capable of operating in the system of FIG. 1, according to one embodiment. In some embodiments, mobile terminal 1501, or a portion thereof, constitutes a means for performing one or more steps of providing aggregated notifications for travel segments. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1503, a Digital Signal Processor (DSP) 1505, and a receiver/transmitter unit including a microphone gain control unit and a speaker gain control unit. A main display unit 1507 provides a display to the user in support of various applications and mobile terminal functions that perform or support the steps of providing aggregated notifications for travel segments. The display 1507 includes display circuitry configured to display at least a portion of a user interface of the mobile terminal (e.g., mobile telephone). Additionally, the display 1507 and display circuitry are configured to facilitate user control of at least some functions of the mobile terminal. An audio function circuitry 1509 includes a microphone 1511 and microphone amplifier that amplifies the speech signal output from the microphone 1511. The amplified speech signal output from the microphone 1511 is fed to a coder/decoder (CODEC) 1513.

A radio section 1515 amplifies power and converts frequency in order to communicate with a base station, which is included in a mobile communication system, via antenna 1517. The power amplifier (PA) 1519 and the transmitter/modulation circuitry are operationally responsive to the MCU 1503, with an output from the PA 1519 coupled to the duplexer 1521 or circulator or antenna switch, as known in the art. The PA 1519 also couples to a battery interface and power control unit 1520.

In use, a user of mobile terminal 1501 speaks into the microphone 1511 and his or her voice along with any detected background noise is converted into an analog voltage. The analog voltage is then converted into a digital signal through the Analog to Digital Converter (ADC) 1523. The control unit 1503 routes the digital signal into the DSP 1505 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1525 for compensation of any frequency-dependent impairments that occur during transmission though the air such as phase and amplitude distortion. After equalizing the bit stream, the modulator 1527 combines the signal with a RF signal generated in the RF interface 1529. The modulator 1527 generates a sine wave by way of frequency or phase modulation. In order to prepare the signal for transmission, an up-converter 1531 combines the sine wave output from the modulator 1527 with another sine wave generated by a synthesizer 1533 to achieve the desired frequency of transmission. The signal is then sent through a PA 1519 to increase the signal to an appropriate power level. In practical systems, the PA 1519 acts as a variable gain amplifier whose gain is controlled by the DSP 1505 from information received from a network base station. The signal is then filtered within the duplexer 1521 and optionally sent to an antenna coupler 1535 to match impedances to provide maximum power transfer. Finally, the signal is transmitted via antenna 1517 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1501 are received via antenna 1517 and immediately amplified by a low noise amplifier (LNA) 1537. A down-converter 1539 lowers the carrier frequency while the demodulator 1541 strips away the RF leaving only a digital bit stream. The signal then goes through the equalizer 1525 and is processed by the DSP 1505. A Digital to Analog Converter (DAC) 1543 converts the signal and the resulting output is transmitted to the user through the speaker 1545, all under control of a Main Control Unit (MCU) 1503 which can be implemented as a Central Processing Unit (CPU) (not shown).

The MCU 1503 receives various signals including input signals from the keyboard 1547. The keyboard 1547 and/or the MCU 1503 in combination with other user input components (e.g., the microphone 1511) comprise a user interface circuitry for managing user input. The MCU 1503 runs a user interface software to facilitate user control of at least some functions of the mobile terminal 1501 to provide aggregated notifications for travel segments. The MCU 1503 also delivers a display command and a switch command to the display 1507 and to the speech output switching controller, respectively. Further, the MCU 1503 exchanges information with the DSP 1505 and can access an optionally incorporated SIM card 1549 and a memory 1551. In addition, the MCU 1503 executes various control functions required of the terminal. The DSP 1505 may, depending upon the implementation, perform any of a variety of conventional digital processing functions on the voice signals. Additionally, DSP 1505 determines the background noise level of the local environment from the signals detected by microphone 1511 and sets the gain of microphone 1511 to a level selected to compensate for the natural tendency of the user of the mobile terminal 1501.

The CODEC 1513 includes the ADC 1523 and DAC 1543. The memory 1551 stores various data including call incoming tone data and is capable of storing other data including music data received via, e.g., the global Internet. The software module could reside in RAM memory, flash memory, registers, or any other form of writable storage medium known in the art. The memory device 1551 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1549 carries, for instance, important information, such as the cellular phone number, the carrier supplying service, subscription details, and security information. The SIM card 1549 serves primarily to identify the mobile terminal 1501 on a radio network. The card 1549 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for aggregating notifications for a vehicle operating in an autonomous or assisted driving mode, comprising:
   determining a plurality of notifications associated, respectively, with a plurality of conditions occurring on at least one travel segment on which the vehicle is operating in the autonomous or assisted driving mode, wherein the plurality of conditions requires or recommends the vehicle to exit the autonomous or assisted driving mode when the vehicle travels through any one respective condition of the plurality of conditions;
   aggregating the plurality of notifications into at least one aggregated notification based, at least in part, on a travel threshold between the plurality of conditions; and
   presenting the at least one aggregated notification in place of separately presenting the plurality of notifications in a display of the vehicle when the vehicle is detected to approach, based on a threshold, the plurality of conditions occurring on the at least one travel segment,
   wherein the at least one aggregated notification is presented before the vehicle automatically compensates for the plurality of conditions or a manual control option is activated.

2. The method of claim 1, further comprising:
   determining the travel threshold based, at least in part, on a fixed distance.

3. The method of claim 1, further comprising:
   wherein the travel threshold is a road distance threshold or a travel time threshold; and
   wherein the aggregation of the plurality of notifications, the presentation of the at least one aggregated notification, or a combination thereof is based, at least in part, on the road distance threshold or the travel time threshold.

4. The method of claim 3, further comprising:
   determining an average travel time based, at least in part, on average probe speed information for traveling one or more distances between the plurality of conditions occurring on the at least one travel segment,
   wherein the aggregation of the plurality of notifications, the presentation of the at least one aggregated notification, or a combination thereof is based, at least in part, on a comparison of the average travel time against the travel time threshold.

5. The method of claim 3, further comprising:
   determining a personalized travel time for the vehicle based, at least in part, on travel speed information associated with the vehicle for traveling one or more distances between the plurality of conditions occurring on the at least one travel segment,
   wherein the aggregation of the plurality of notifications, the presentation of the at least one aggregated notification, or a combination thereof is based, at least in part, on a comparison of the personalized travel time against the travel time threshold.

6. The method of claim 5, wherein the travel speed information includes, at least in part, current travel speed information, historical travel speed information, predicted travel speed information, or a combination thereof.

7. The method of claim 5, further comprising:
   determining profile information, contextual information, or a combination thereof associated with the vehicle, the operator of the vehicle, or a combination thereof; and
   determining the travel speed information based, at least in part, on the profile information, the contextual information, or a combination thereof.

8. The method of claim 7, wherein the profile information includes, at least in part, age information, gender information, demographic information, or a combination thereof.

9. The method of claim 5, wherein the travel speed information includes, at least in part, a current travel speed of the at least one vehicle, the method further comprising:
   comparing the current travel speed to at least one safe speed specified for the at least one travel segment, the plurality of conditions, or a combination thereof to determine whether to initiate the aggregation of the plurality of notifications, the presentation of the at least one aggregated notification, or a combination thereof.

10. The method of claim 1, wherein the plurality of conditions includes a high curvature road, poor road conditions, a construction area, parked cars, or a combination thereof.

11. An apparatus for aggregating notifications for a vehicle operating in an autonomous or assisted driving mode, comprising:
    at least one processor; and
    at least one memory including computer program code for one or more programs, the at least one memory and the computer program code configured to, with the at least one processor, cause the apparatus to perform at least the following;
    determine a plurality of notifications, respectively, associated with a plurality of conditions occurring on at least one travel segment on which the vehicle is operating in the autonomous or assisted driving mode, wherein the plurality of conditions requires or recommends the vehicle to exit the autonomous or assisted driving mode when the vehicle travels through any one respective condition of the plurality of conditions;
    aggregate the plurality of notifications into at least one aggregated notification based, at least in part, on a travel threshold between the plurality of conditions; and
    present the at least one aggregated notification in place of separately presenting the plurality of notifications in a display of the vehicle when the vehicle is detected to approach, based on a threshold, the plurality of conditions occurring on the at least one travel segment,
    wherein the at least one aggregated notification is presented before the vehicle automatically compensates for the plurality of conditions or a manual control option is activated.

12. The apparatus of claim 11, wherein the apparatus is further caused to:
  determine the travel threshold based, at least in part, on a fixed distance.

13. The apparatus of claim 11,
  wherein the travel threshold is a road distance threshold or a travel time threshold; and
  wherein the aggregation of the plurality of notifications, the presentation of the at least one aggregated notification, or a combination thereof is based, at least in part, on the road distance threshold or the travel time threshold.

14. The apparatus of claim 13, wherein the apparatus is further caused to:
  determine an average travel time based, at least in part, on average probe speed information for traveling one or more distances between the plurality of conditions occurring on the at least one travel segment,
  wherein the aggregation of the plurality of notifications, the presentation of the at least one aggregated notification, or a combination thereof is based, at least in part, on a comparison of the average travel time against the travel time threshold.

15. The apparatus of claim 13, wherein the apparatus is further caused to:
  determine a personalized travel time for the vehicle based, at least in part, on travel speed information associated with the vehicle for traveling one or more distances between the plurality of conditions occurring on the at least one travel segment,
  wherein the aggregation of the plurality of notifications, the presentation of the at least one aggregated notification, or a combination thereof is based, at least in part, on a comparison of the personalized travel time against the travel time threshold.

16. The apparatus of claim 15, wherein the apparatus is further caused to:
  determine profile information, contextual information, or a combination thereof associated with the vehicle, the operator of the vehicle, or a combination thereof; and
  determine the travel speed information based, at least in part, on the profile information, the contextual information, or a combination thereof.

17. The apparatus of claim 15, wherein the travel speed information includes, at least in part, a current travel speed of the at least one vehicle, the method further comprising:
  compare the current travel speed to at least one safe speed specified for the at least one travel segment, the plurality of conditions, or a combination thereof to determine whether to initiate the aggregation of the plurality of notifications, the presentation of the at least one aggregated notification, or a combination thereof.

18. A non-transitory computer-readable storage medium for aggregating notifications for a vehicle operating in an autonomous or assisted driving mode, carrying one or more sequences of one or more instructions which, when executed by one or more processors, cause an apparatus to perform:
  determining a plurality of notifications associated with a plurality of conditions occurring on at least one travel segment on which the vehicle is operating in the autonomous or assisted driving mode, wherein the plurality of conditions requires the vehicle to exit the autonomous or assisted driving mode when the vehicle travels through the plurality of conditions;
  aggregating the plurality of notifications into at least one aggregated notification based, at least in part, on a travel threshold between the plurality of conditions; and
  presenting the at least one aggregated notification in place of separately presenting the plurality of notifications in a display of the vehicle when the vehicle is detected to approach, based on a threshold, the plurality of conditions occurring on the at least one travel segment,
  wherein the at least one aggregated notification is presented before the vehicle automatically compensates for the plurality of conditions or a manual control option is activated.

19. The non-transitory computer-readable storage medium of claim 18, wherein the apparatus is further caused to perform:
  determining an average travel time based, at least in part, on average probe speed information for traveling one or more distances between the plurality of conditions occurring on the at least one travel segment,
  wherein the aggregation of the plurality of notifications, the presentation of the at least one aggregated notification, or a combination thereof is based, at least in part, on a comparison of the average travel time against the travel threshold.

20. The non-transitory computer-readable storage medium of claim 18, wherein the apparatus is further caused to perform:
  determining a personalized travel time for the vehicle based, at least in part, on travel speed information associated with the vehicle for traveling one or more distances between the plurality of conditions occurring on the at least one travel segment,
  wherein the aggregation of the plurality of notifications, the presentation of the at least one aggregated notification, or a combination thereof is based, at least in part, on a comparison of the personalized travel time against the travel threshold.

* * * * *